(12) United States Patent
Stronge et al.

(10) Patent No.: US 11,113,131 B2
(45) Date of Patent: Sep. 7, 2021

(54) METHOD FOR COLLECTING PERFORMANCE DATA IN A COMPUTER SYSTEM

(71) Applicant: EMC IP Holding Company LLC, Hopkinton, MA (US)

(72) Inventors: William R. Stronge, Westford, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 118 days.

(21) Appl. No.: 16/524,417

(22) Filed: Jul. 29, 2019

(65) Prior Publication Data

US 2021/0034451 A1    Feb. 4, 2021

(51) Int. Cl.
| | | |
|---|---|---|
| *G06F 11/00* | (2006.01) | |
| *G06F 11/07* | (2006.01) | |
| *G06F 11/34* | (2006.01) | |
| *G06F 11/30* | (2006.01) | |

(52) U.S. Cl.
CPC ...... *G06F 11/0745* (2013.01); *G06F 11/3041* (2013.01); *G06F 11/3476* (2013.01); *G06F 11/3495* (2013.01)

(58) Field of Classification Search
None
See application file for complete search history.

(56) References Cited

U.S. PATENT DOCUMENTS

| | | | |
|---|---|---|---|
| 6,804,627 B1 | 10/2004 | Marokhovsky et al. | |
| 7,502,972 B1 * | 3/2009 | Chilukuri | G06F 11/3688 714/38.12 |
| 7,885,954 B2 | 2/2011 | Barsness et al. | |
| 8,417,691 B2 | 4/2013 | Brodsky et al. | |
| 9,842,017 B1 * | 12/2017 | Zhang | G06F 11/3452 |
| 2017/0269985 A1 * | 9/2017 | Xiao | G06F 16/285 |
| 2018/0285184 A1 * | 10/2018 | Hotta | G06F 11/0709 |
| 2019/0171644 A1 * | 6/2019 | Xu | G06F 11/08 |

OTHER PUBLICATIONS

Google Scholar/Patents—text refined (Year: 2020).*
Google Scholar/Patents—text refined (Year: 2021).*

* cited by examiner

*Primary Examiner* — Christopher S McCarthy
(74) *Attorney, Agent, or Firm* — Daly, Crowley, Mofford & Durkee, LLP

(57) ABSTRACT

First information for a first event of a computer system is captured, including first event parameters. A first event key is generated, based on the first event parameters. The first information and first key are both stored as a first event in a storage structure, in which the first event key indexes the first event and the captured first information. When second information is captured for a second event, a second event key is generated based on second event parameters of the captured second event. If the second event key matches the first event key, then the first event stored in the event collection system is dynamically updated to store the second event information as part of the first event, to minimize additional storage space needed in the storage structure for the second event.

20 Claims, 13 Drawing Sheets

| Sequence Number | Service | Command | Count | Accumulated Duration | Average Duration |
|---|---|---|---|---|---|
| 1 | Front_End | IO_Start | 110 | 2750 | 25 |
| 2 | IO_Queue | Queue | 110 | 5500 | 50 |
| 3 | Name_Service | Lookup_Volume | 110 | 8250 | 75 |
| 4 | Cache_Service | Cache_Hit | 110 | 16500 | 150 |
| 5 | Mapping_Service | Lookup_Backend_Location | 110 | 33000 | 300 |
| 6 | Back_End | Read | 100 | 80000 | 800 |
| 6 | Back_End | Read_Meta_Data | 10 | 8000 | 800 |
| 7 | Front_End | IO_Complete | 100 | 2200 | 22 |
| 7 | Back_End | Read | 10 | 8000 | 800 |
| 8 | Front_End | IO_Complete | 10 | 220 | 22 |

1000

| Service | Command | Count | Accumulated Duration | Average Duration |
|---|---|---|---|---|
| Front_End | IO_Start | 128 | 3200 | 25 |
| IO_Queue | Queue | 128 | 6400 | 50 |
| Name_Service | Lookup_Volume | 128 | 9600 | 75 |
| Cache_Service | Cache_Hit | 128 | 19200 | 150 |
| Mapping_Service | Lookup_Backend_Location | 128 | 38400 | 300 |
| Back_End | Read | 128 | 102400 | 800 |
| Front_End | IO_Complete | 128 | 2816 | 22 |

1500

METHOD FOR COLLECTING PERFORMANCE DATA IN A COMPUTER SYSTEM

FIELD

This application relates at least generally to devices, systems, and methods for collecting performance data for computer systems, including computer systems for managing and storing data and resources in a virtualized environment. More particularly, this application relates at least to adding infrastructure to a computer system to collect events for recording and analysis to improve computer system performance.

BACKGROUND

Computer systems may include different resources used by one or more host processors. Resources and host processors in a computer system may be interconnected by one or more communication connections. These resources may include, for example, data storage and/or information processing devices such as those manufactured by DELL EMC Corporation of Hopkinton, Mass. For example, such data storage and/or information processing systems may be coupled to one or more host processors and provide storage and/or information processing services to each host processor. Multiple data storage systems from one or more different vendors may be connected and may provide common data storage and/or data processing capabilities for one or more host processors in a computer system. A host may perform a variety of data processing tasks and operations using the data storage system. For example, a host may perform basic system input/output (I/O operations in connection with data requests, including but not limited to data read and write operations, database queries, backup operations (including local, remote, and cloud backups), and many other processes, as will be appreciated.

In some instances, host systems may store and retrieve data using a data storage system containing a plurality of host interface units, disk drives, and disk interface units. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

SUMMARY

This Summary is provided to introduce a selection of concepts in a simplified form, to provide a basic understanding of one or more embodiments that are further described below in the Detailed Description. This Summary is not intended to identify key features or essential features of the claimed subject matter, nor is it intended to be used to limit the scope of the claimed subject matter.

In one aspect, a computer-implemented method is provided. An event collection system is configured to capture event data for a plurality of events of a computer system, wherein the event collection system is configured to filter event data, in accordance with a predetermined setting, to determine the event data that is captured by the event collection system and to determine how captured event data is stored in an event storage structure of the event collection system. First information relating to a first event of the computer system is captured, the first information comprising information relating to a first respective plurality of event parameters. A first event key is generated, based on at least some of the first plurality of event parameters. The first event key and the captured first information are stored as part of a first event storage in the event storage structure, wherein the first event key is configured to index the first event and the captured first information in the event storage structure. Second information is captured relating to a second event of the computer system, the second information comprising information relating a second respective plurality of event parameters. A second event key is generated based on the second plurality of event parameters. If the second event key does not match the first event key, then the second event key and the captured second information are stored as a second event in the event storage structure, wherein the second event key is configured to index the second event and the captured second information in the event storage structure, and wherein the second event is distinct from the first event, in the event storage structure. If the second event key matches the first event key, then the first event stored in the event collection system is dynamically updated to store the second event information as part of the first stored event, wherein storing the second event information as part of the first stored event is configured to minimize any additional storage space needed, in the event collection structure, for second event storage.

In some embodiments, dynamically updating the first event storage further comprises configuring an event counter in the event storage structure to track how many events that are stored in the event storage structure, share the same event key; and incrementing the event counter to add the second event to a respective first event count it maintains for the first event. In some embodiments, dynamically updating the first event storage further comprises aggregating the second information with the first information. In some embodiments, dynamically updating the first event storage further comprises configuring the first event key to also index the second event and the captured second information in the event storage structure.

In some embodiments, the first plurality of event parameters comprises at least a portion of parameters that are unique to the first event, and the first event key is generated by combining the portion of parameters that are unique to the first event, into the first key.

In some embodiments, the predetermined setting comprises an operational mode selected from the group consisting of: single host input/output (IO) capture; sequential host IO capture; single host IO capture with other IO's; and capture all IOs.

In some embodiments, at least a portion of the events stored in the event storage structure are analyzed to detect at least one problem resulting in at least one performance issue in the computer system, and, based on the analysis, the operation of the computer system is changed to fix the at least one problem.

In another aspect, a system is provided, comprising a processor and a non-volatile memory in operable communication with the processor, the non-volatile memory storing computer program code that when executed on the processor causes the processor to execute a process operable to perform certain operations. One operation comprises configuring an event collection system to capture event data for a plurality of events of a computer system, wherein the event collection system is configured to filter event data, in accordance with a predetermined setting, to determine the event data that is captured by the event collection system and to determine how captured event data is stored in an event storage structure of the event collection system. One operation comprises capturing first information relating to a first event of the computer system, the first information comprising information relating to a first respective plurality of event parameters. One operation comprises capturing first information relating to a first event of the computer system, the first information comprising information relating to a first respective plurality of event parameters. One operation comprises storing the first event key and the captured first information, as part of a first event storage in the event storage structure, wherein the first event key is configured to index the first event and the captured first information in the event storage structure. One operation comprises capturing second information relating to a second event of the computer system, the second information comprising information relating a second respective plurality of event parameters. One operation comprises generating a second event key based on the second plurality of event parameters. One operation comprises, if the second event key does not match the first event key, then storing the second event key and the captured second information as a second event in the event storage structure, wherein the second event key is configured to index the second event and the captured second information in the event storage structure, and wherein the second event is distinct from the first event, in the event storage structure. One operation comprises, if the second event key matches the first event key, then dynamically updating the first event stored in the event collection system, to store the second event information as part of the first stored event, wherein storing the second event information as part of the first stored event is configured to minimize any additional storage space needed, in the event collection structure, for second event storage. In yet another aspect, a computer program product is provided, the computer program product including a non-transitory computer readable storage medium having computer program code encoded thereon that when executed on a processor of a computer causes the computer to operate a storage system. The computer program product comprises computer program code for configuring an event collection system to capture event data for a plurality of events of a computer system, wherein the event collection system is configured to filter event data, in accordance with a predetermined setting, to determine the event data that is captured by the event collection system and to determine how captured event data is stored in an event storage structure of the event collection system. The computer program product also comprises computer program code for capturing first information relating to a first event of the computer system, the first information comprising information relating to a first respective plurality of event parameters. The computer program product also comprises computer program code for generating a first event key, based on at least some of the first plurality of event parameters. The computer program product also comprises computer program code for storing the first event key and the captured first information, as part of a first event storage in the event storage structure, wherein the first event key is configured to index the first event and the captured first information in the event storage structure.

The computer program product also comprises computer program code for capturing second information relating to a second event of the computer system, the second information comprising information relating a second respective plurality of event parameters. The computer program product also comprises computer program code for generating a second event key based on the second plurality of event parameters.

The computer program product also comprises computer program code for providing, if the second event key does not match the first event key, for storing the second event key and the captured second information as a second event in the event storage structure, wherein the second event key is configured to index the second event and the captured second information in the event storage structure, and wherein the second event is distinct from the first event, in the event storage structure. The computer program product also comprises computer code for providing, if the second event key matches the first event key, for dynamically updating the first event stored in the event collection system, to store the second event information as part of the first stored event, wherein storing the second event information as part of the first stored event is configured to minimize any additional storage space needed, in the event collection structure, for second event storage.

Details relating to these and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

Figure 14:
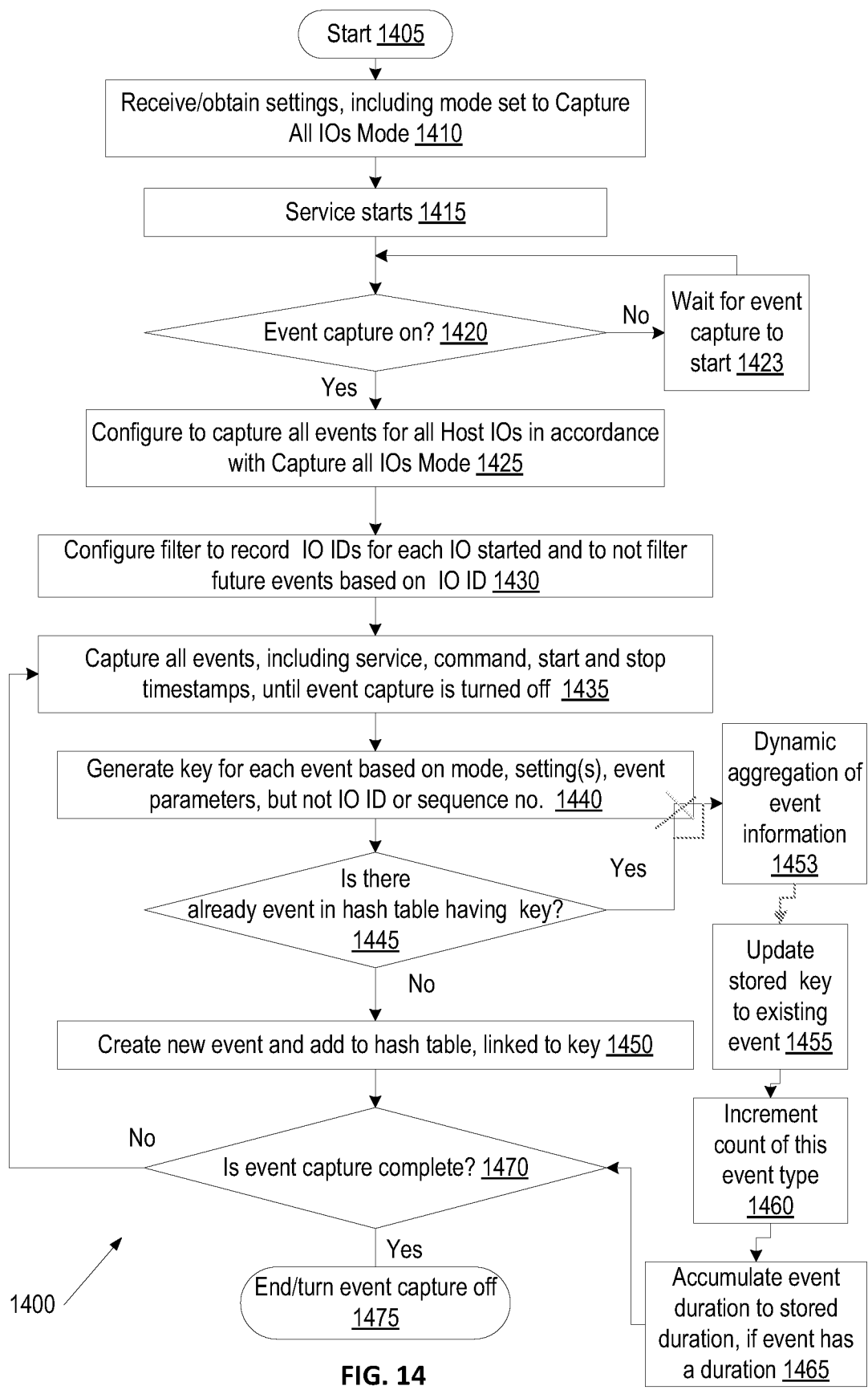
FIG. 14 is a simplified flowchart of a method for collecting information relating to event processing, for a Capture All IOs Mode, in accordance with at least one disclosed embodiment.
Figure 15:
Figure 16:
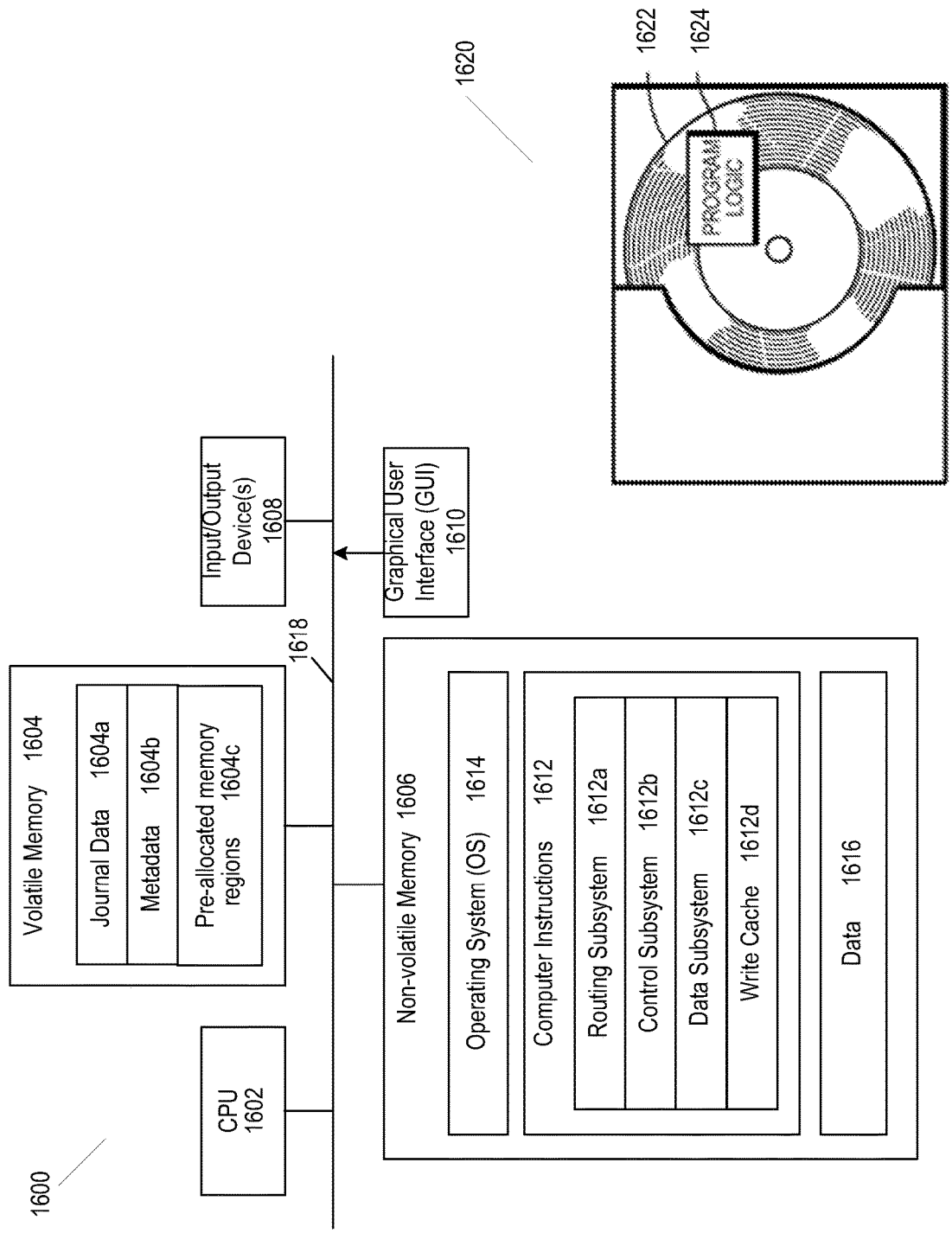

FIG. 15 is a chart showing, in tabular form, an illustrative example of Capture All IOs Mode information collected in accordance with the method of FIG. 14, in accordance with at least one disclosed embodiment; and FIG. 16 is a simplified block diagram of an apparatus that may be used to implement at least a portion of the systems and methods of FIGS. 1-15, in accordance with at least some embodiments.

DETAILED DESCRIPTION

At least some illustrative embodiments will be described herein with reference to exemplary information processing systems and associated computers, servers, storage devices and other processing devices. It is to be appreciated, however, that embodiments described herein are not restricted to use with the particular illustrative system and device configurations shown. In addition, embodiments can include, without limitation, apparatus, systems, methods, and computer program products comprising processor-readable storage media. In addition, although some examples herein are described in connection with events associated with storage systems, the disclosure is not so limited. Those of ordinary skill in the art will appreciate that the disclosures herein have applicability to any type of computerized system or implementation where performance can be monitored, especially those wherein optimization of system resource usage is important, those where one action or event taking place potentially could have impact on other actions taking place (whether at the same time or afterwards), or in any systems of configurations where there is processing of many transactions, events, or operations, each using a series of steps or events.

Before describing embodiments of the concepts, structures, and techniques sought to be protected herein, some terms are explained. The following description includes several terms for which the definitions are generally known in the art. However, the following glossary definitions are provided to clarify the subsequent description and may be helpful in understanding the specification and claims.

As used herein, the term "storage system" is intended to be broadly construed to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "information processing system" may be used to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Cloud computing is intended to refer to all variants of cloud computing, including but not limited to public, private, and hybrid cloud computing. In addition, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

In certain embodiments, the term "computer-readable media" may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

In certain embodiments, the term "I/O request" or simply "I/O" may be used to refer to an input or output request, such as a data read or data write request, which can originate at a host, at a user, or at any other entity in operable communication with a computer system.

In certain embodiments, the term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a data service may be a service for receiving, processing, storing, and protecting data. In certain embodiments, data services provide the high-level data and storage management capabilities of an exemplary computer system used in at least some embodiments.

In certain embodiments, an input/output (referred to herein interchangeably as I/O or IO) refers at least to the communication between two entities, such as a client and a server, a host and an information processing system, a computer and a human or another computer system, etc. The "input" part of IO refers at least to the signals or data that is being received at an entity (where an entity can be a human, machine, software program, etc.) and outputs refer at least to signals or data sent from the entity that received the input. In certain embodiments, entities can be configured to receive inputs and send outputs, as well as to send inputs and receive outputs. In at least some embodiments, IO refers at least to one or more actions or events that make up an IO process or service.

In certain embodiments, an event refers at least to an action to which an entity, e.g., a computer system entity, must respond, sometimes through creation and maintenance of an event queue or loop. Events, in certain embodiments, can include IO and events, in certain embodiments can be part of IO. Events, in certain embodiments, can be parts or steps in processing of an operation, such as an IO. For example, during processing of an IO, steps can include things like an IO is placed on a queue to be processed and IO sent to a mapping service, and, in certain embodiments, each of these steps (along with others) can be considered to be an event.

In some embodiments, events include actions by a user, such a key press or a mouse movement. In some embodiments, events include any action or occurrence recognized by software, including those originating asynchronously from an environment external to a computer system, which is handled by a computer system, such as a request from a host, and actions involved in servicing that request. Events also can be generated or triggered by a computer system itself. In some embodiments, events are handled synchronously with the program flow, such as within an event loop or event queue, that is, the software may have one or more dedicated places where events are handled, such as an event loop. Sources of events also can include user inputs, outputs from hardware devices (e.g., timers), and actions triggered by software, such as notifications or communications regarding task completion, error detection, etc. Certain events can have priority over other events.

Events can be used as part of event-driven programming/software, which refers at least to programming/software in which a program is configured to constantly evaluate and responds to events. Events, in at least some embodiments, are unique and can be described by a unique set of parameters. In addition, events can represent a specific point in time or a period of time. Events also can encompass steps in other processes, such as a set of steps/events involved with a process, including but not limited to both simple and complex processes such as reading an input/output (IO) from memory or storage, querying a database, creating a duplicate of a file, backing up data from a primary storage system to a secondary storage system, and restoring data from a backup.

A key refers at least to an item by which data, data files, and/or events, can be stored and searched. For example, in certain embodiments herein, a key corresponds to an identifier for a record or group of records in a data file. In certain embodiments, including those involving databases, a key can also be called a key field, sort key, index, or key word. In certain embodiments as described further herein, keys are generated based at least in part on one or more event parameters.

In certain embodiments, a hash refers at least to mapping information to a numerical value via a hashing function. In certain embodiments, hashing can convert an identifier or key into a value for the location of the corresponding data in a structure such as a table.

In certain embodiments, a log refers at least to a record (e.g., a file) of the communications (i.e., events, IO, transactions, etc.) between a system and the users of that system, which record may include the type, content, and/or the time of transactions or other interactions. In certain embodiments, a log may include a record of events. In certain embodiments, log files can show any discrete event within an application or system, such as a failure, and error, or a state transformation, so that, if something went wrong in the system, information such as a state transformation may help indicate which change actually caused an error. In at least some embodiments, logging is used at an operational level in a system, to provide a high-level view of computer system issues. In some implementations, the logging can be periodic, such as by periodic sampling. In certain embodiments, a log can be formed using a table of values representing information. In certain embodiments, different types of efficient, space-saving, logs or records can be created by modifying the way the recorded information is captured and stored, including, in certain embodiments, aggregating certain events together based on one or more common features of events.

In certain embodiments, a trace is a type of logging that can track execution of all or part of an execution of a program or process. In certain embodiments, a trace can be configured to monitor an execution of an entire process or program from start to end. In certain embodiments, a trace can monitor the execution of all steps (e.g., events) associated with a given process, or can follow a program's data flow and progression. In some embodiments, tracing can be configured to follow a single user's journey through an entire stack of applications or other programs. By tracing through a stack, developers can identify bottlenecks and focus on improving performance.

In certain embodiments, a trace can be a representation of a series of causally related distributed events that encode the end-to-end request flow through a distributed system. For example, a given trace can provide visibility into both the path traversed by a request as well as the structure of a request. The path of a request can allow analysis of different services involved in the path of a request, and the structure of a request helps one understand the junctures and effects of asynchrony in the execution of a request. In certain embodiments, a trace-like functionality can be provided, without having to use a trace, by identifying specific execution points that may correspond to forks in execution flow or a hop or fan out across network or process boundaries in an application, proxy, framework, library, runtime, middleware, and anything else in the path of a request and by capturing, aggregating, and storing, specific data relating to those points. These specific execution points, in certain embodiments, can represent potential bottlenecks and/or places where there can be contention for resources, or other conditions that may negatively impact system performance.

Conventional tracing can involve a lot of data and thus can be "expensive" both in time and system resources needed to implement. However, in certain embodiments, providing event capture and collection functionality, as described herein, can provide advantages similar to conventional tracing, such as helping with problems by showing how, when, and of often a given problem and/or delay occurred, such as which function, the function's duration, parameters passed, and how far into the function the user could get.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments. Any particular embodiment may include a plurality of "optional" features unless such features conflict.

In addition, in the implementations that follow, it should be understood that, although certain specific embodiments may reference particular brands and names of products (e.g., Dell EMC products) none of the embodiments described herein are intended to be limited to using products from this or any other any vendor. At least some embodiments are intended to be fully hardware and software agnostic.

There are various ways to monitor performance of computer systems, such as storage and/or information processing systems. Computer system operation can be analyzed to determine whether the computer system's hardware or software is performing as desired, and if an error is encountered, various processes can be used to determine the source of the error. For example, one way to attempt to determine an error in the code executing on a computer system is to insert a log command or trace command into the code at strategic points in a computer system. Each time the processing of an input/output (IO) passed one of these strategic points, an entry can be created in the log or tracing system. Logs and/or traces logs can help to give a picture of where a computer system is spending its resources and processing times. But, depending on how often entries are collected, whether with logs or traces (or both) even the collection of data itself can impact performance and/or can result in collecting so much data that it can be difficult to analyze. Additionally, in a typical logging or tracing system, there is no way to turn it on or off, which means that the logging or tracing system is always impacting system performance.

Further, the logs, in some instances, can get filled up so quickly with information, that existing information gets overwritten. In many logging or tracing systems, each log or trace event is retained, individually. For example, a given module of a computer system might run 50,000 IO's a second, and the computer system may have a plurality of code modules. Assume that a user wants to analyze 10 minutes worth of data in each of first and second modules of a given computer system, to determine an aggregate of the performance over that 10 minutes. At a rate of 50,000 IOs a second, the user would have to analyze a log containing 180 million IOs, to determine that a first IO spend a certain first amount of time in the first module, a second IO spend a second amount of time in the first module, etc., then attempt to aggregate those with other IOs, e.g., for those of a second module, to get a complete picture of how much all time system IOs are spending in each of first and second modules during that 10 minute span. This kind of analysis can be extremely difficult and time consuming.

For logs or traces that are done over long periods of time (where "long" can be relative term, depending on the computer system, as will be appreciated) a "long" time, for some so-called "midrange" computer systems, might be only 10 seconds. In other examples, for other types of computer systems, such as XtremIO from Dell EMC, "long" might be several hours. In any system using conventional logs and/or traces, the storage requirements are always increasing as each new event must be kept individually. This means that, eventually, older logging/tracing data must be purged, limiting the period over which data can be gathered and, thus, limiting the scope, and possibly the effectiveness, of performance analysis.

It can be challenging to go through the information stored from such logs and traces manually. Even if automated scripts can be created to go through logs, the actual capture of the amount of data that has to be gone through to produce useful results can, in and of itself, degrade and impact system or other performance. Further, in at least some logging or tracing systems, there is no way to turn the logging or tracing off, so this means that such logging or tracing is always impacting system performance. Thus, in certain embodiments described herein, performance information can be collected from a storage system by adding an infrastructure that collects events. These events can be recorded and then analyzed later to determine how the storage system performance can be improved.

The infrastructure in at least some embodiments described herein can be implemented in various ways, including providing the infrastructure as an entity or product separate from a computer system, by being implemented as part of a host communicating with a computer system and a computer system itself, or at or part of any other client or entity in operable communication with the system whose performance data is being collected, or some embodiments of the infrastructures described herein could be provided in a format such as software as a service (SaaS) or as a software "add-on" or extension configured to add this capability to existing software and/or hardware.

In certain embodiments, it is preferable to have the data collection and event capture that is part of this infrastructure, be as close as possible to the code and events/IOs being analyzed, because the further away the data collection is from the code being analyzed, the lower the granularity. For example, in one embodiment, if the computer system platform is a high performance platform like a storage array, advantageously, the infrastructure for event capture and collection, is built into storage array software. In certain embodiments, for analyzing events that are microseconds apart, the code/events that are being captured and analyzed, and the infrastructure itself doing the analysis, are running together, such that the infrastructure event collection and recordation, is built into that system directly. In certain embodiments, where the events being captured and analyzed are slower (e.g., seconds apart), then the infrastructure for event capture and recording can be implemented further away, such as via SaaS.

In certain embodiment described herein, systems, methods, and devices are provided to help address some of these issues and to help collect performance data for a computer system, such as a storage system. In certain embodiments, performance information can be collected from a computer system by adding an infrastructure that collects events. In certain embodiments, these events can be recorded and then analyzed later to determine how the computer system performance can be improved.

The processing of an individual host IO in a storage system or other computer system can, in certain embodiments, be looked at as a series of events. Below is a simplified set of events an exemplary host read IO might go through:

(1) IO received at the front end of the array
(2) IO is placed on a queue to be processed
(3) IO is taken off the queue
(4) IO is sent to a name service to determine which internal volume the IO is for
(5) IO is sent to a Cache service to determine if the data for the IO is already in cache
(6) Assuming the data is not already in cache, IO is sent to a mapping service to determine where the data is actually located in the back end storage
(7) Issue a read command to read the data from the back end storage
(8) Return the data to the host Recording the above events (1) through (8), and when each event occurred and how long it lasted, can reveal performance information about the system in which they are processed. As an example, recording these events could help show, for instance, which step or steps in the IO processing takes the most amount of time. In addition, recording or monitoring events can help to show whether certain events or parts of events, that relate to accessing a physical device like a storage device, might be slowed by things like latency time and disk seek. Another issue to identify can be contentions in the system that can occur when two or more entities or parts of a process, such as sections of code, devices compete for the same or shared resources (e.g., a data structure), which result in degradation of performance. For example, in certain embodiments, a given host might have different processes running that are both attempting to access the same parts of a shared table. In some embodiments, the two or more sections of code may be running in a single host or multiple hosts. The two or more processes contending for simultaneous access to a data structure or other resources (e.g., data storage, or to a database, etc.), can result in contention for these common resources and can lead to bottlenecks. Thus, it can be advantageous to be able to determine where performance degradation takes place, whether it be certain actions, certain processes or sections of code running on one or more hosts or other devices, certain code, certain paths, certain execution points, certain users, and/or certain circumstances, so that remediation for the degradation can be implemented, if possible.

Figure 1:
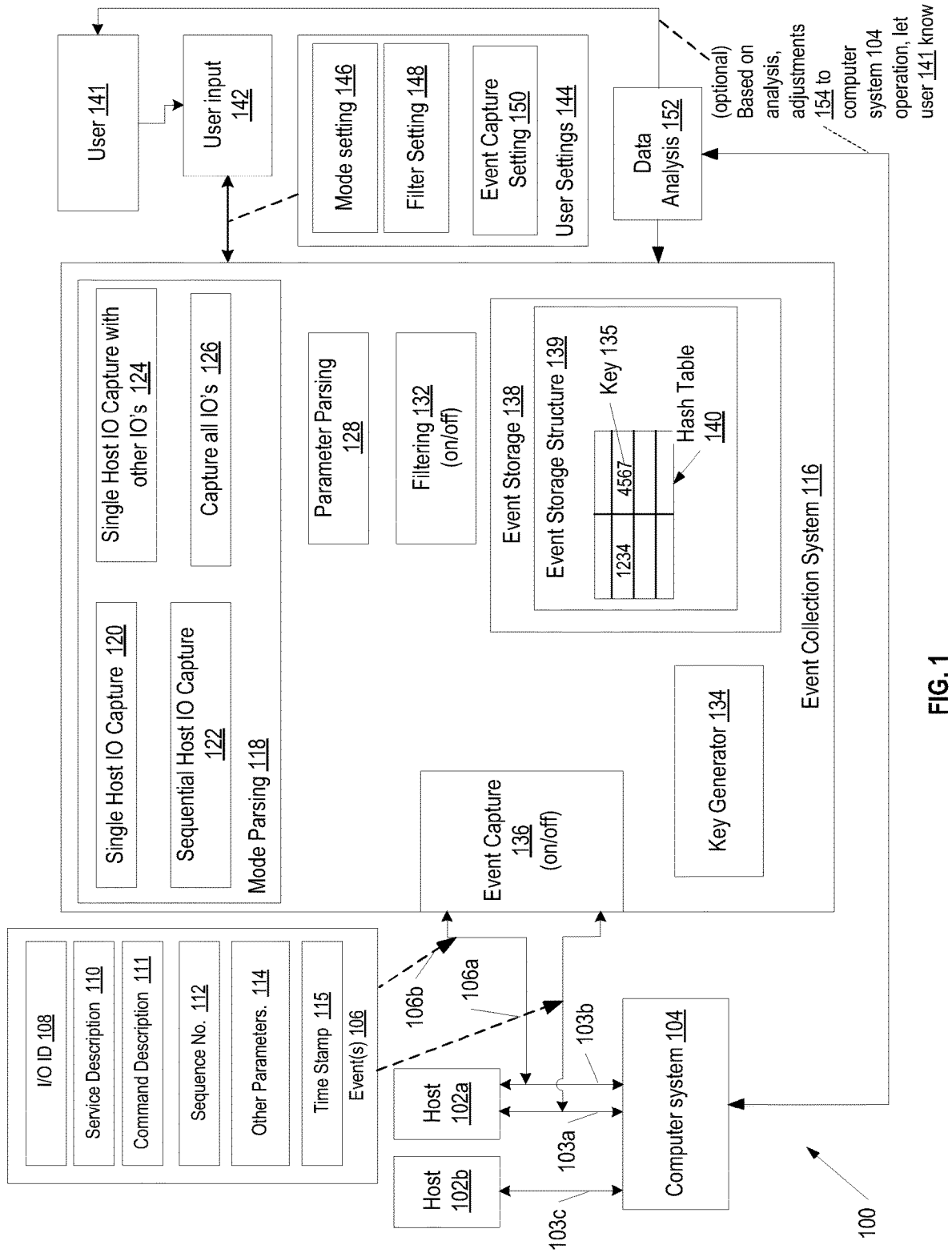
FIG. 1 is a functional block diagram of an exemplary system configured to collect performance data of a computer system, in accordance with at least one illustrative embodiment of the disclosure.
Figure 2:
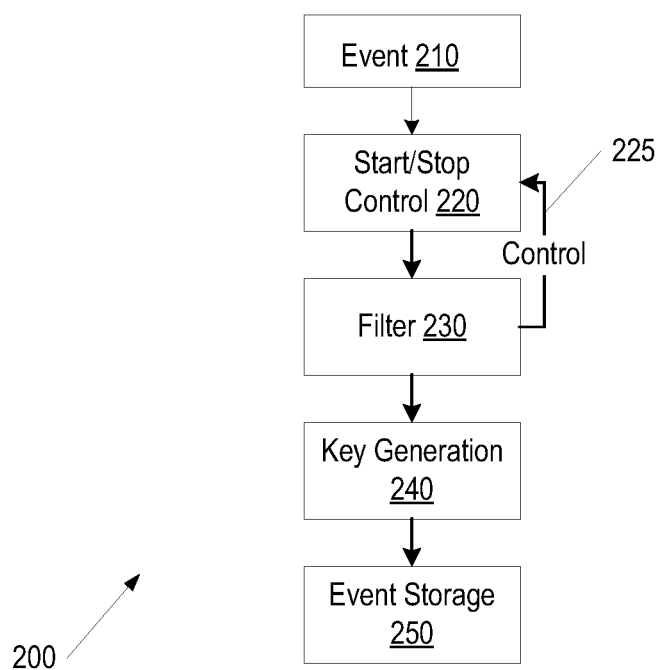
FIG. 2 is a simplified flowchart showing an overview of a high-level method of collecting information relating to event processing, usable with the system of FIG. 1, in accordance with one illustrative embodiment of the disclosure.

FIG. 1 is a functional block diagram of an exemplary system 100 configured to collect performance data of a computer system 104, in accordance with at least one illustrative embodiment of the disclosure. FIG. 2 is a simplified flowchart 100 showing an overview of a high-level method of collecting information relating to event processing, usable with the system of FIG. 1, in accordance with one illustrative embodiment of the disclosure.

Referring to FIGS. 1 and 2, one or more hosts 102a, 102b send one or more requests 103a, 103b, 103c (e.g., 10 requests, database requests, or other types of requests), to computer system 104. For the purposes of describing the embodiment of FIGS. 1 and 2, it will be assumed in this illustrative example that the requests 103a, 103b are IO requests from the single host 102a, but this is not limiting. As will be understood, a single host 102a can generate many IOs in parallel and thus can generate competition for a shared resource, and similarly multiple hosts 102a, 102b also can generate IOs in parallel that can generate competition for shared resources. Each IO 103 processed in the computer system 104, if running in parallel, can result in competition for resources regardless of how many hosts 102 generated the requests. In certain embodiments, the requests 103a, 103b may include one or more events 106a, 106b to be captured. An event 106 can include or be described by a set of parameters, including but not limited to an IO identifier 108, a service description 110, a command description 111, a sequence number 112, and optionally one or more other parameters 114. In certain embodiments, the event 106 also may include a time stamp 115.

In certain embodiments, as described further herein, information is recorded, in the event collection system 116, about events 106, including when each event occurred, and how long it lasted. Each event 106, in certain embodiments, is described by a set of parameters 108-114, as noted above and as shown in FIG. 1, which provide information needed for recording the events 106. Since each event 106, is certain embodiments, must be unique, at least part of the set of parameters that describe a unique event 106 also must be unique. As an example, in one embodiment, the following set of parameters could uniquely define the set of events 106 associated with processing of a read IO request 103 to the computer system 204 (e.g., a described in steps (1) through (8) discussed previously):

(1) IO identifier (ID) 108—This uniquely defines the processing for a particular IO. In certain embodiments, the unique IO ID 108 is independent of the host where it originated.

(2) Service description 110—Uniquely describes what block of code is starting to process this host IO. From this example above this would be:
(a) Front end
(b) IO Queue
(c) Name Service
(d) Cache Service
(e) Metadata Service
(f) Backend (3) Command description 111 that tells the service what to do with the IO. For example, read data, perform a lookup, etc.

An event 106 can represent a specific point in time, or it can represent a period of time. For instance, the Front End event above, may be when the IO 103a arrives from the host 102a, corresponding to a point in time, while the Cache Service event above represents the period of time the IO was processed in the Cache Service. In order to support this, an event 106, in certain embodiments, also includes a timestamp 115 for when it was created and when the processing for the event was concluded.

The event 106 also includes a sequence number 112, in certain embodiments. The sequence number 112, in certain embodiments, is simply an incrementing numerical value that is bumped up (incremented) each time an event 106 is created. The sequence number 112 is initialized when event capturing starts at the event capture subsystem 136 of the collection system 116. The sequence number 112 makes every step in the IO processing unique and can distinguish two events 106 that otherwise would look the same. For example, if a given Host IO 103 had to make two calls into the same service with the same command, each call would have its own respective sequence number 112. A sequence number 112 also can help distinguish between IOs that have different processing steps. This is described further below in connection with FIGS. 7-10 which relate to the Sequential Host IO Capture Mode. The event 106 may also include other information or other parameters 114 that can aid in analyzing the performance of the storage system, as will be appreciated. For example, in certain embodiments, the other parameters 14 could be anything that is useful in analyzing system performance, such as system state and/or state of the volume to which the IO 103 was directed.

Referring again to FIG. 1, the event collection system 116 provides an infrastructure to collect events for later analysis. The event collection system 116 can be implemented as part of an independent system, or can be part of a host subsystem 102, a computer system 104, or part of any entity in operable communication with either the host 102 or the computer system 104, such that it can intercept or otherwise receive communications between a host 102 and a computer system 104, or such that it can be in communication with any entity configured to have access to events 106. In certain embodiments, however, the event collection system 116 advantageously is implemented within the processes or code whose performance is being analyzed, because the further away the event collection is from the actual processing the more time is needed between events 106 that are being collected.

In certain embodiments, the event collection system 116 also is configured to receive user input 142, such as user settings 144, from a user 141 (which can be a person but which also can be an entity, such as a hardware or software entity, as will be appreciated) and to communicate with a data analysis system 152, each of which is described further herein. That is, in certain embodiments, some automation in setting the parameters of event collection is possible, and in certain embodiments, the results of the event capturing can be sent to separate data analysis systems and software.

In certain embodiments, the event collection subsystem 116 includes a number of subsystems configured to perform event collection related functions, including but not limited to a mode parsing subsystem 118, a parameter parsing subsystem 128, a filtering subsystem 132, a key generator subsystem 134, an event capture subsystem 136, event storage 138 including, in certain embodiments, a hash table 140. Each of these is described further herein.

The mode is set by the user 141, in certain embodiments, or in automated software that is configured to run a performance test, where the mode setting 146 is set according to the data that is to be captured, The parsing subsystem 118 is responsive to user input 142 and parses the user input user mode setting 146 and, based on the selection, configures one or more of the other subsystems (e.g., filtering 132, key generation 134, event capture 136, event storage 138) of the event collection system 116 in accordance with the mode setting. In at least one embodiment, four different modes are possible: Single Host IO Capture 120, Sequential Host IO Capture 122, Single Host IO Capture with other IOs 124, and Capture all IOs 126. Each of these modes is discussed further herein, in connection with their respective flowcharts.

In addition, it will be appreciated that user settings 144 can be configured to create other customized event capturing modes. In certain embodiments, a user may request that the event collection system 116 perform a first event capture and recordation using a first mode then, based on the data analysis 152 (e.g., issues that may have been found), request that the event collection system 116 perform a subsequent event capture and recordation using a different mode. In further embodiments, user settings 144 could be configured to vary when events/IO are captured, such as with periodic sampling, random selection of IO, etc. For example, in sequential host IO capture mode 122 (described further herein), in certain embodiments, one IO 103 is captured and then once it has been captured, the event collection system 116 randomly picks another IO 103 to capture. In certain embodiments, for example. the sequential host IO capture mode 122 is adapted to be made periodic by waiting a fixed period of time between IO captures.

The event capture subsystem 126 receives captured events 106 and cooperates with the other subsystems, such as the parameter parsing subsystem 128, to determine the parameters of an event 106 that is captured and to provide the appropriate parameter information that is captured/collected (e.g., all the parameters 108-115 described above, that are part of an event 106), to the appropriate subsystem of the event collection system 116, so that the events 106 of interest can be captured and recorded, for later analysis. In certain embodiments, calls to the event capturing subsystem 126 are put at significant places in the IO processing code.

In certain embodiments, places where the event collection system 116 captures events 106 are manually placed into strategic places in the computer system 104 processes/code that are running on that system (e.g., if the computer system 104 was a storage array, into the storage array code), in a manner analogous to the way traces can be placed. Similar to traces, when the process or code executes through part of the process/code where an event capture has been setup a check is made initially (e.g., block 320 of FIG. 3) to determine whether the event collection system 116 is turned on or not. If it is not turned on, then the existing process or code running on the computer system 105 runs normally. In certain embodiments, the check to see whether event collection system 116 is enabled is very "light weight" and, thus, when the event collection system 116 and event capture subsystem 136 are not capturing there is no impact to performance of the computer system 104.

Event capture, in accordance with at least some disclosures herein, is different from traces in that tracing is either on or off. In contrast, the event capturing described herein, especially in connection with the modes, is a more "intelligent" approach to gathering and recording event data to provide information on computer system 104 performance. For example, event capturing is more intelligent in that it does further filtering to determine whether to capture an event 106 or not.

In certain embodiments, calls to the event capturing subsystem 126 are put at the starting point and/or the ending point of each service or tied to a single predetermined point in a service, but these options are not limiting. Calls to the event capturing infrastructure could be put anywhere in a service or in an executing process, as will be understood. The event capturing subsystem 136 processes each event 106 through a stack which corresponds to the flowchart 200 of FIG. 2, which is discussed further herein.

The time stamp information 115 associated with a given event 103 is recorded, via the event capture subsystem 136. As noted above, each event 106 includes a timestamp 115 for when it was created and when the processing for the event 106 was concluded. As is understood, all computer systems 104 have a clock which can be read to get a timestamp 115, that is used in connection with event capture. In certain embodiments, the timestamp 115 is stored as an entry in the hash table 140.

Referring to FIGS. 1 and 2, in certain embodiments, a first step in processing an event is to determine whether event capturing 136 is on or off (block 220 of FIG. 2, start/stop control). This check of event capturing subsystem 136 status is, in certain embodiments, a quick test, which means the event processing subsystem 136 has very little impact when it is not on. In certain embodiments, event capturing 136 can be turned on/off by the user via user settings 142, such as via the event capture setting 150. In some embodiments, or in some modes of operation, and/or detection that an IO or other event or action is complete, the event capturing of the event capture subsystem 136 it is turned on/off automatically.

Referring again to FIGS. 1 and 2, the next step is event filtering (block 230), done by the filtering subsystem 132. The filtering subsystem 132 determines which events 106 are actually captured. For example, in certain embodiments, it might be desirable to only capture the events 106 for a single host IO 103. In this case the event filter subsystem 132 would only pass events 106 that had the same IO identifier 108; all other events 106 would be rejected. In certain embodiments, the filtering subsystem 132 can also turn the event capturing of the event capture subsystem 136 on or off. For example, in a mode that involves capturing a single IO 103, the filtering subsystem 132 would turn off the event capture subsystem 136 when it is known that the last event 106 in processing the Host IO 103 has been received.

In certain embodiments, user input settings 142 include a filter setting 148 that configures the filtering subsystem 132. In certain embodiments, the user input 142 of a mode setting 146 effectively provides settings for configuring the filtering subsystem 132, to determine what events 106 to capture. Other examples of configuring the filtering subsystem 132 are described further herein in connection with the descriptions of the different operating modes of the event collection system 116. The filtering subsystem 132, in certain embodiments, can also turn the event capturing subsystem 136 on or off.

After filtering (block 230) comes key generation (block 240), performed by the key generation subsystem 134, which uses one or more parameters that uniquely describe an event 106, along with the sequence number 112, to compose a key 135 for the event 106. The key generator subsystem 134 combines some or all of parameters of an event 106, including, in certain embodiments, the unique parameters of an event 106, into a key 135. Depending on the mode setting 146 that is received, one or more of the parameters of an event 106 that are used to create the key 135 could be set to a common value. For example, in one embodiment, the key generator subsystem 134 might set the IO identifier 108 to zero, so that a key 135 is generated based on all the unique parameters except the IO identifier 108. The effect of this would be to cause all events from all IOs 103 to be captured at the event capture subsystem 136.

In another example, in certain embodiments of IO captures, in a mode such as Single Host IO capture (described further below), where certain data is collected but all the IO identifiers 108 for the data are the same, although other aspects of the event or IO may be unique, as will be appreciated.

In certain embodiments, the key 135 is used in the final step of the flowchart of FIG. 2, event storage (block 250), which involves persisting the event 106. In certain embodiments, the events 106 are persisted in an event storage structure 139, which in FIG. 1 is a hash table 140 which is accessed by the key 135. It will be appreciated by those of skill in the art that the event storage structure 139 is not required to be a hash table 140 and could be any suitable data structure that can be configured to store information, especially indexed by an identifier such as a key, including but not limited to arrays, stacks, sets, linked lists, trees, graphs, keyword trees, matrices, hash trees, etc., and many other types, as will be understood by those of skill in the art. In addition, although not shown specifically in FIG. 1, the event storage subsystem 138 and/or event storage structure 139 can include additional information associated with the key 135 when the event 106 is persisted to event storage 138, such as a count of the number of events 106 recorded of a specific type and a duration (e.g., between start and end time).

In certain embodiments, persisting the key 135 into the hash table 140 can be done in two phases. The first phase uses the key 135 to lookup in the hash table 140 to see if there is already an event 106 there with this key 135. The second phase involves persisting the event 106 information, which means either updating an existing event 106 (if one was found) or creating a new event 106 and adding it to the hash table 140. When an existing event 106 in the hash table 140 is updated, in certain embodiments, the following actions can take place. An event count (not shown in FIG. 1) can be incremented to indicate how many of these types of events 106 have been recorded. If the event 106 has a duration (that is, the event 106 has a start timestamp and an end timestamp), then a duration for this event 106 is accumulated to the duration that is already stored. The average duration for this event 106 can be calculated by dividing the accumulated duration by the count.

Figure 3:
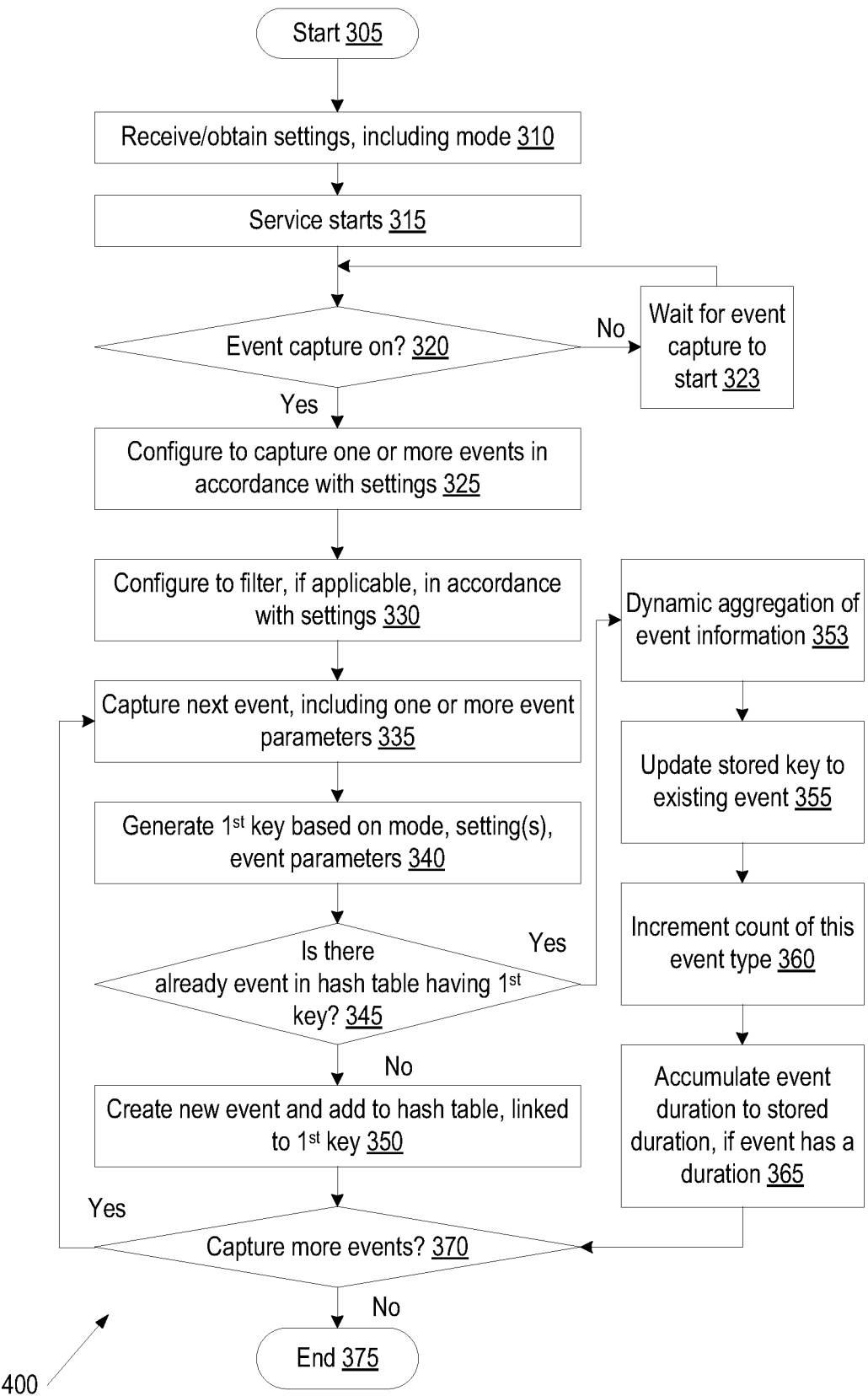
FIG. 3 is a simplified flowchart providing more details of the method of FIG. 2, in accordance with one illustrative embodiment of the disclosure.

FIG. 3 is a simplified flowchart 300 providing more details of the method of FIG. 2, as operable in the system 100 of FIG. 1, in accordance with one illustrative embodiment of the disclosure. Referring to FIGS. 1, 2 and 3, at the start (block 305) the event collection subsystem 116 receives or otherwise obtains user settings 144, including a mode setting 146 (block 310). The host IO service starts (block 315) and a check is made to determine if the event capture subsystem 136 is configured to turn on event capture (320). If the answer at block 320 is "no", the event collection system 116 waits to start collecting events (block 323) until event capture is turned on (i.e., answer at block 320 is "yes").

Once event capture is on, then the event collection system 116 is configured to capture one or more events 106 in accordance with the user settings 144 (325), such as the mode setting 146 and further, if applicable to filter in accordance with settings (block 330). An event 106 is captured (block 335) that includes one or more event parameters 108-115. In certain embodiments, the parameter parsing subsystem 128 helps to identify the parameters in the captured event, such the IO ID 108, the associated service description 110, a description of the command 111, the sequence number 112, and a time stamp 115. A first key 135 is generated (block 340), based at least in part on the mode, user settings 144 and/or event parameters. In certain embodiments, a check is made (block 345), using the key 135, to determine if the hash table 140 already has any events having a key 135 the same as the first key. If the answer at block 345 is "No", then a new event is created (block 350) and added to the hash table 140, linked to the first key 135.

If the answer at block 345 is "Yes" (there is an event 106 in the hash table 140 having the first key 135 or associated with the first key 135), then dynamic aggregation of the data relating to the captured event, takes place (block 353). That is, as the event data is being collected, it is dynamically combined or aggregated with existing collecting data, based on commonality of one or more parameters of the event data, and this dynamic aggregation is facilitated at least in part via selecting particular modes of collecting data to provide filtering during the collection process and via use of keys to allow data with common parameters to be easily aggregated or grouped together for analysis. This filtering and dynamic aggregation, in certain embodiments, enables the event collection process to have less of a performance impact and require less storage, as compared to other approaches.

As part of this dynamic aggregation, the first key 135 in the hash table 140 is dynamically updated to reflect that an additional event is associated with it (block 355). In addition, the count of the type of event 106 is dynamically incremented to reflect that there is another event of that type having the same key (block 360). If the event 106 has a duration (i.e., a start and end timestamp 115), then the duration for the event 106 is dynamically accumulated (block 365) to the duration that is already stored in event storage 138. This enables an average duration for the event 106 to be computed by dividing the accumulated duration by the count. This dynamic aggregation also allows data analysis of the collected and recorded information, to be simpler and quicker than with larger logs and traces which have many, many entries.

At block 370, a check is made to determine whether more events are to be captured (block 370). For example, if event capture 136 is still on or if the mode or other settings indicate that more events are to be captured (e.g., all events associated with a certain service or process), then processing returns to block 335 to capture the next event. Else, if the answer at block 370 is "No", then processing ends (block 375). Although not shown in FIG. 3, optionally, in certain embodiments, instead of processing ending at block 375, it can return to block 320 to wait until event capture 136 is turned back on.

In certain embodiments, the event collection system 116 can operate in several modes. As noted herein, the user determines which mode should be used via the mode setting 146 in the user settings. The mode parsing subsystem 118 helps the event collection system 116 to determine if the mode is one of Single Host IO Capture 120, Sequential Host IO Capture 122, Single Host IO Capture with other IOs 124, Capture all IOs 126, or some other mode or a custom mode set by a user. Based at least in part on the selected mode, the filtering subsystem 132 is configured for a particular type of filtering, and the filtering helps determine which events are actually captured.

Figure 4:
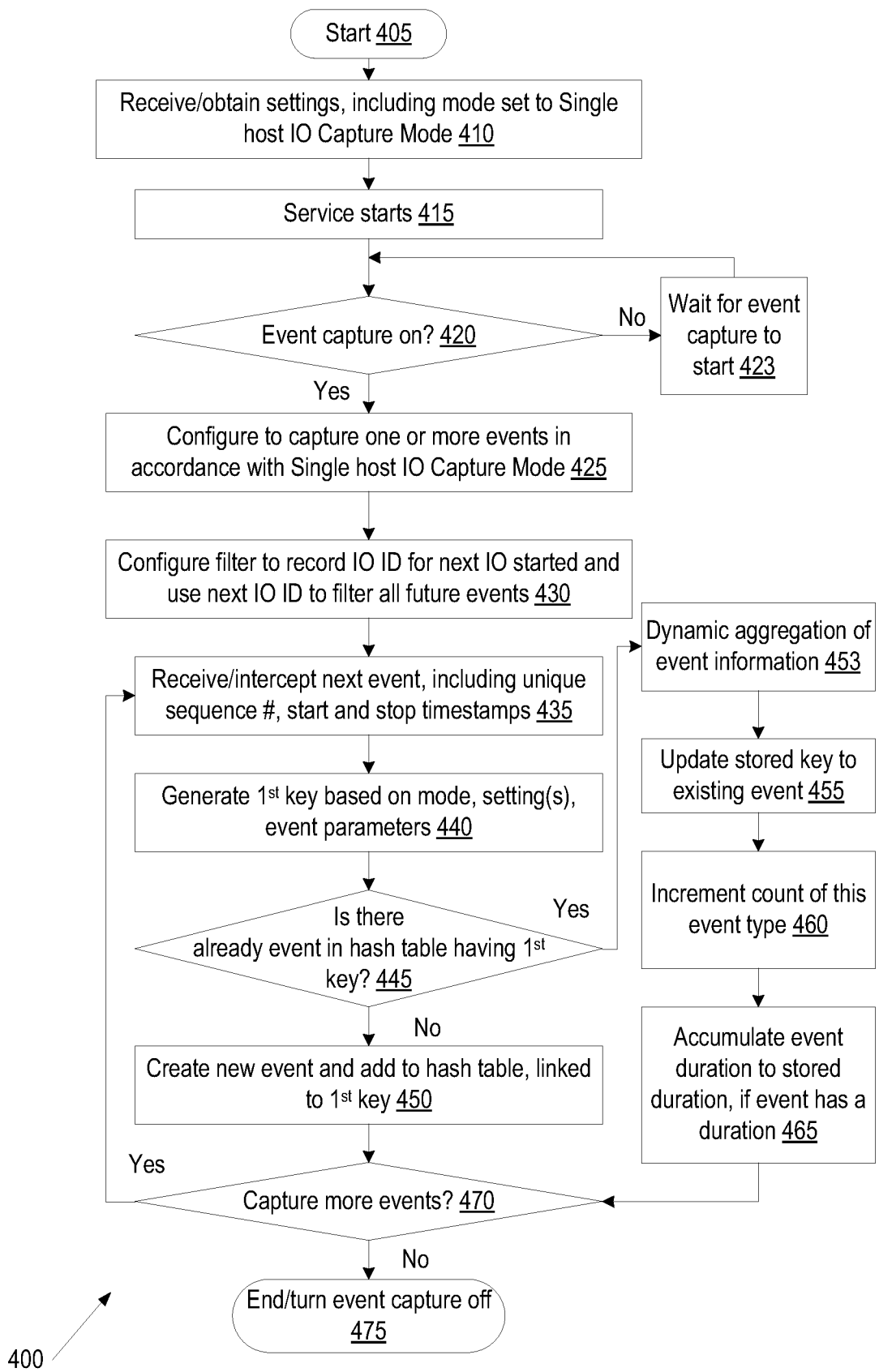
FIG. 4 is a simplified flowchart of a method for collecting information relating to event processing, for a Single Host Input/Output (IO) capture mode, in accordance with one illustrative embodiment.

FIG. 4 is a simplified flowchart 400 of a method for collecting information relating to event processing, for a Single Host Input/Output (IO) capture mode 120, in accordance with one illustrative embodiment. In Single Host IO Capture mode 120 all the events for a single random Host IO 103 are captured. In certain embodiments, the single random Host IO 103 corresponds to whatever is the next IO to start after event collection is enabled (turned on). FIG. 4 shows how this is done, in at least one embodiment. Blocks 405-425 are substantially similar to the functions of corresponding blocks 305-325 in FIG. 3, other than the fact that the settings are setting the mode specifically to Single Host IO Capture 120, so the descriptions of these blocks are not repeated here.

To enable the Single Host IO Capture mode 120, when the event capture subsystem 136 is turned on (e.g., in certain embodiments, by the user), to start capturing, the filtering subsystem 132 is configured to record the IO identifier 108 for the next Host IO 103 that is started (block 430), and this IO identifier 108 is then used to by the filtering subsystem 132 filter all future events 106. As noted above, this next Host IO 103 after event capture subsystem 136 is turned on, can be random in that it is not known what that the next IO 103 will be.

In certain embodiments, as the events 106 are captured (block 435), each event 106 includes a unique sequence number 112. The sequence number 112 records the order in which the events 106 were generated. In some embodiments, such as when an IO 103 is sent to a computer system, such as a storage array (not shown in FIG. 1, but well understood in the art), the order in which the events 106 are generated also corresponds to the order of the steps that the storage array takes when it processes the IO 103. In certain embodiments, as the events 106 are captured (block 435), each event 106 also includes a start and stop timestamp 115 which indicates how long the processing took for this event 106.

As with the flowchart 300 of FIG. 3, blocks 445 through 465 of FIG. 4 are substantially the same as corresponding blocks 340 through 365 of FIG. 3, and the description of the blocks is not repeated here. In particular, note that the dynamic aggregation of block 453 is substantially similar to that of block 323. In block 470, a check is made whether to capture more events (answer is "Yes" at block 470, in which case processing returns to block 435), or whether the filtering system 132 has detected that the last event for host IO processing has taken place (answer is "No" at block 470). When the filter subsystem 132 detects the last event 106 for the Host IO processing, the event capture subsystem 136 is turned off (block 475).

Figures 5, 6:
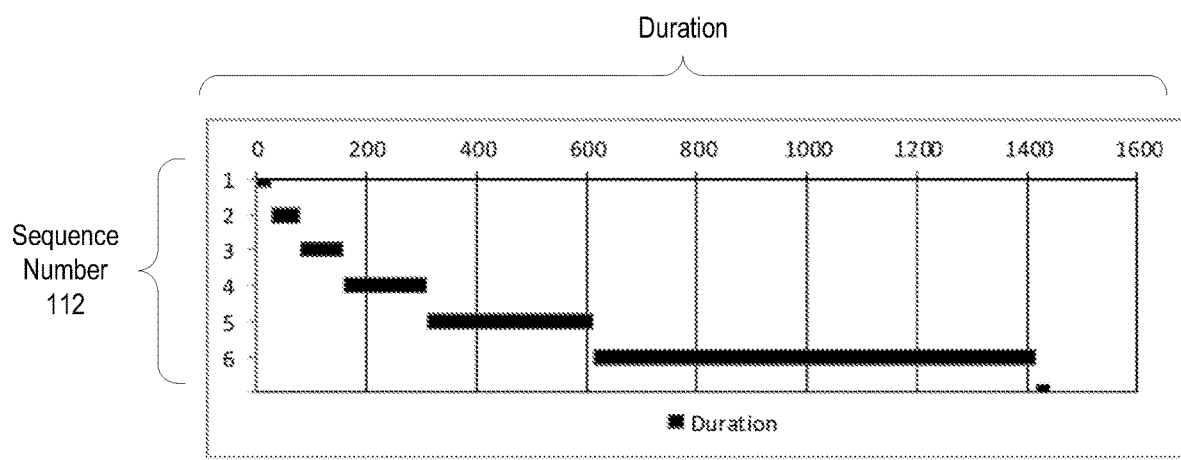
FIG. 5 is a simplified chart showing, in tabular form, an illustrative example of Single IO Capture Data information collected in accordance with the method of FIG. 4, in accordance with one illustrative embodiment of the disclosure.
FIG. 6 is an illustrative graph showing the Single IO Capture Data information of the chart of FIG. 5, in graphical timeline form, in accordance with at least one disclosed embodiment.

In certain embodiments, once the data has been captured, the data from the persistence hash table 140 can be read and then sorted by the sequence number 112 and analyzed. In certain embodiments, the data can be viewed in its tabular form or a graphical timeline. For example, FIG. 5 is a simplified chart 500 showing, in tabular form, an illustrative example of Single IO Capture Data information collected in accordance with the method of FIG. 4, in accordance with one illustrative embodiment of the disclosure. FIG. 6 is an illustrative graph 600 showing the Single IO Capture Data information of the chart of FIG. 5, in graphical timeline form, by sequence number along Y axis and duration along X axis, in accordance with at least one disclosed embodiment, showing sequence number and duration information.

As FIG. 5 shows, all the data in the chart 500 has the same IO identifier 108, indicating that all the services are associated with the single random host IO 103, which in this case is a random IO 103 having the IO identifier 108 of 1229. It also can be seen in FIG. 5 that the single random host IO 103 goes through each service step from Front_end (IO_Start command) to Front_end (IO_complete command), similar to the steps (1) through (8) described earlier, and that certain services and commands have significantly longer durations than others, such as the Back_End service Read Command, the Metadata_Service command Lookup_Backend_location. This is also illustrated in the graphical timeline chart 600 of FIG. 6, which has sequence number along the Y axis and duration along the X axis. The Single IO Host Capture mode 120 allows analysis of all the steps of all the other events 106 that are captured that are related to the event 106 with the IO identifier 108 that was used by the filtering subsystem 132 to perform filtering. This helps the analysis to determine where the computer system 104 and/or host system 102 is spending time in the processing of the original IO associated with the IO identifier 108 used for filtering. Based on the data analysis 152, in certain embodiments, option adjustments to the operation of the computer system 104 and/or the host 102 can be implemented. This also may result in hardware and/or software adjustments, changes (including to components) not shown in FIG. 1, as will be appreciated, to improve IO performance, as will be appreciated.

Figure 7:
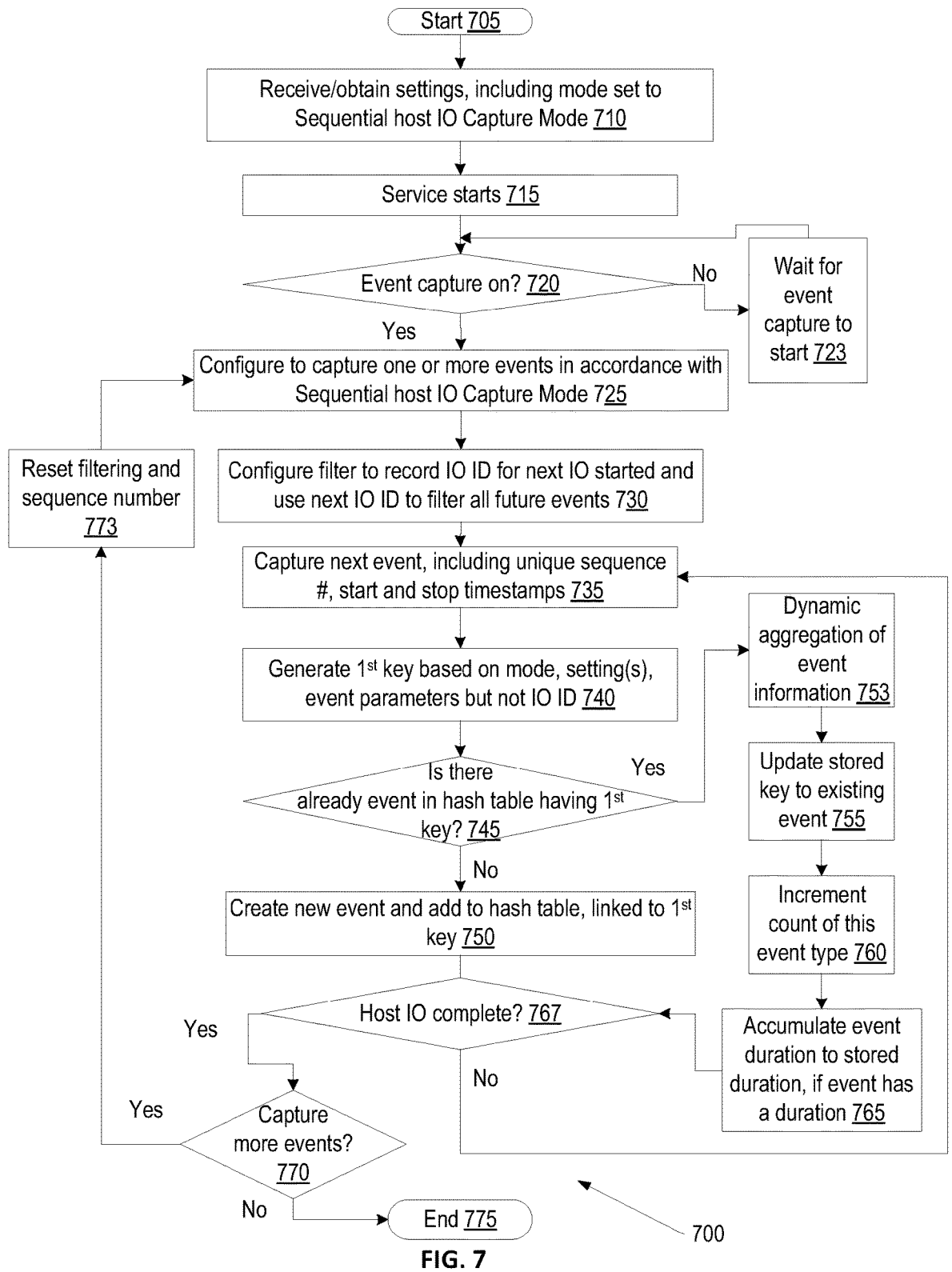
FIG. 7 is a simplified flowchart of a method for collecting information relating to event processing, for a Sequential Host IO Capture Mode, in accordance with at least one disclosed embodiment.

FIG. 7 is a simplified flowchart 700 of a method for collecting information relating to event processing, for a Sequential Host IO Capture Mode 122, operating in the system of FIG. 1, in accordance with at least one disclosed embodiment. In certain embodiments, the Sequential Host IO Capture Mode 122 works by doing a series of single Host IO captures. Once the data has been captured for a single IO 103, a new capture is started on a new Host IO 103. The key 135 is generated with the IO ID identifier 108 set to zero (IO identifier 108 is not used to generate the key) and the data from the previously captured IO(s) is not erased.

In at least one embodiment, not using the IO identifier 108 to generate key and not erasing data from previously captured IOs, in Sequential Host IO Capture mode 122, means that this mode is collecting a series of IO captures (in certain embodiments, a large number of IOs) from a single host 102. In certain embodiments, the Sequential Host IO Capture mode 122 is similar to the Single Host IO Capture mode 120, in that in both modes, information is collected from just one host. However, in certain embodiments, Sequential Host IO Capture mode 122 differs from Single Host IO Capture mode 120 in this way: in Single Host IO Capture mode 120, the event collection system 116 is configured to capture all the events associated with a single IO request 103, whereas in Sequential Host IO Capture mode 122, the event collection system 116 is configured to capture a series of events over a plurality of sequential IOs 103, all from the same host 102, wherein each sequential IO 103 comes after possibly is associated with its own respective events. This is seen as discussed further herein, in FIGS. 8 and 9, which correspond to two sequential IO's 103 from the same host 102 (i.e., a primary IO in FIG. 8 and a secondary IO in FIG. 9). These are discussed further below.

In addition, by not using IO host identifier 108 to generate key and by not erasing data from previously captured IOs, in Sequential Host IO Capture mode 122, this also means that when each event 106 is persisted in event storage 138, the method of FIG. 7 finds an already existing event 106 that has the same key, so that existing event 106 is updated rather than a new event 106 being persisted. In certain embodiments, one advantageous feature of the Sequential Host IO Capture Mode 122 is providing ability to get the average duration times for events 106 across large numbers of IOs 103, rather than for just a single IO 103, because an average duration time of a single IO 103 may or may not, be representative of the times needed to process an IO 103 in the system.

Referring to FIGS. 1 and 7, blocks 705 through 723 are substantially similar to corresponding blocks 305 through 323 of FIG. 3, other than the different mode setting, and the description is not repeated here. However, in block 720, when the answer is "Yes" and the event capture subsystem 136 is turned on (e.g., in certain embodiments, by the user, and in certain embodiments, event capture could be turned on automatically as part of an automated test, such as if system software is configured to detect that IO performance is not meeting expectations, the event capture subsystem 126 can be turned on automatically, to gather performance data that might help in analysis of the IO performance), the filtering subsystem 132 records the IO identifier 108 for the next Host IO 103 that is started (block 730), and the event collection system 116 and uses this IO identifier 108 to filter all future events 106. That means, in certain embodiments, that all the event captures in this mode will be a series of Host IO 103 captures all from the same Host 102, where the sequential events 106 happen in sequence after an initial host IO 103. In addition, the key generator subsystem 134 does not use the IO identifier 108 to generate the key 135; rather, a combination of one or more different parameters. In certain embodiments, for sequential host IO capture 122, the key is generated using all parameters, but the IO ID 108 is set to zero.

In certain embodiments, the event capture subsystem 136 is configured with another user setting 144 or parameter (not shown in FIG. 1) defining the granularity of event collection. For example, a given code or process is configured to have a set of many event captures points and corresponding event captures, which are inserted into a code or process. If a user wants to capture many events for each IO for future detailed analysis, a user setting 144 for fine grained capture is used, wherein a larger subset of the possible event captures, including possibly all of them, can be used during event capture. If a user wants an overall view of the code or process, without the same level of detail, the user setting 144 or parameter is set for coarse grained captures, wherein the subset of possible event captures is smaller than the subset used for fine grained capture, such that events are captured only from some places in the code.

In certain embodiments, as the event capture subsystem 136 captures events 106 (block 735), each event 106 that is captured in accordance with this mode includes respective start and stop timestamps 115, where these timestamps 115 indicate how long the processing took for this event 106. In certain embodiments, the time stamp record subsystem 130 helps to track the time stamps 115. In addition, each event 106 in this mode includes a unique sequence number 112, which records the order in which the events were generated. In certain embodiments, this is also the order of the steps that the storage array took when it processed the IO.

In block 740, the key 135 is generated, based at least in part on the mode (i.e., Sequential Host IO Capture Mode 122), on the user settings 144, the event information, and/or the event parameters, but is not based on or using the IO identifier 108. Blocks 745 through 765 of FIG. 7 are substantially similar to corresponding blocks 345 through 365 of FIG. 3, discussed previously above, and the descriptions of these blocks' functions are not repeated in the same level of detail. Note that, in block 753, the Sequential Host IO Capture Mode 122 also dynamically aggregates the event information, via the actions of blocks 755-765. This is further shown via FIGS. 8-10, discussed further herein. In FIG. 7, in the Sequential Host IO Capture Mode, 122, other than the time when the first Host IO 103 is captured, the lookup of the event 106 in the hash table 140 of event storage 138 will find an already existing event 106 (because it will always at least find the first event 106 captured, stored, and indexed by its respective key 135, so the event count for that event is incremented, and its respective event duration time likewise will be accumulated into the existing events duration that was recorded (see blocks 755-765).

As with the Single Host IO Capture mode 120, in Sequential Host IO Capture Mode 122, a check is made (block 767) to determine whether Host IO 103 is complete. If Host IO 103 is not complete, (answer at block 767 is "No") processing returns to block 735. If the Host IO 103 is completed (answer at block 767 is "Yes") and more events are to be completed (answer at block 770 is "Yes"), then the filtering system 132 is reset (so that it can accept a new IO ID number 108) and the sequence number 112 is also reset (block 755). In certain embodiments, the next IO 103 captured, after answer at block 770 is Yes, effectively is random because the next IO 104 that is captured is the first one to start after the capture for the previous one is finished.

Then, the method restarts at block 725, to then capture the next Host IO 103 that is started, where that next new Host IO 103 is considered to be the initial IO 103 and other IOs 103 in sequence are checked until the new initial host IO 103 is complete. This continues until the user stops the event capturing, which can be shown with "No" answer at block 770.

As an example of the operation of the method of FIG. 7, consider an example where an IO 103 has to go through steps having sequence numbers of 1, 2, 3. When the first IO 103 is captured, it results in corresponding events 106a, 106b, 106c with corresponding respective sequence numbers 1, 2, 3. In addition, in this mode, the IO ID 108 is set to 0 (zero) in the key 135 that is used to up event information in the hash table 140. When the event capture subsystem 136 starts to capture another IO 103, but what is needed is (blocks 770-772), it is desired to dynamically accumulate the times for this next IO 103 with the first IO 103 that was just captured. Thus, when the key 135 is generated for this next IO 103, it is necessary for it to find the same event in the table 140 under which the first IO 103 was stored. Thus, at step 1 (as noted above) the IO ID is set to 0 (zero) and the sequence number 112 is reset to 1, so that when the key 135 is generated and looked up in the has table 140, the entry is found from step 1 for the first IO 103.

Figure 8:
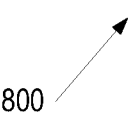
FIG. 8 is a chart showing, in tabular form, an illustrative example of Sequential Host IO Capture—Primary Host IO processing step information collected in accordance with the method of FIG. 7, in accordance with at least one disclosed embodiment.
Figure 9:
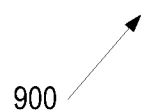
FIG. 9 is a chart showing, in tabular form, an illustrative example of Sequential Host IO Capture—Secondary Host IO processing information collected in accordance with the method of FIG. 7, in accordance with one disclosed embodiment.

The data from the events 106 captured during Sequential Host IO Capture Mode 122 can be analyzed in various ways. For example, in one embodiment, the data can be analyzed to see the average amount time that was spent at each step (e.g., at each respective sequence number 112). It also can be analyzed to see where IOs 103 from a Host 102 spend more time to get certain IOs 103 done, or where they require extra services or steps for certain IOs 103. This is shown in FIGS. 8 and 9 as discussed further below.

In addition, an interesting side effect to the Sequential Host IO Capture Mode 122, in at least some embodiments, is that it also can be configured to capture differences in the processing paths for the IOs 103. For example, in one exemplary embodiment, assume that most IOs 103 are processed with the steps shown in FIG. 8, which is a chart 800 showing, in tabular form, an illustrative example of Sequential Host IO Capture, for a so-called Primary Host, in accordance with the method of FIG. 7.

In certain embodiments, however, processing of an IO 103 takes a slightly different path. Consider FIG. 9, which is a chart 900 showing, in tabular form, an illustrative example of Sequential Host IO Capture, for a so-called Secondary Host 102, in accordance with one disclosed embodiment. A comparison of FIG. 8 and FIG. 9 shows that, in the secondary host of FIG. 9, there is an extra sequence number, corresponding to an "extra" read to the backend to get some metadata for the volume which is needed before the read for the actual IO data. If many IOs 103 are captured from the same Host 102, most of the IOs 103 will be processed using the primary set of steps, but some percentage will be processed using the secondary set of path steps. The resulting event capture data will look something like the chart 1000 of FIG. 10, which is a chart 1000 showing, in tabular form, an illustrative example of Sequential Host IO Capture information collected in accordance with the method of FIG. 7, in accordance with one disclosed embodiment.

Figure 10:
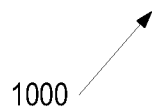
FIG. 10 is a chart showing, in tabular form, an illustrative example of Sequential Host IO Capture information collected in accordance with the method of FIG. 7, in accordance with one disclosed embodiment.

It can be seen in the captured data of the chart 1000 that it contains both the primary and secondary IO processing paths and that 100 out of the 110 IOs 103 captured followed the primary path while 10 IOs followed the secondary path. It also can be seen that the resulting chart 1000 of FIG. 10 shows that, by dynamically aggregating common information from the captured events 106, a lot of information can be conveyed in a more compact format as compared to conventional logs and/or traces that record each event and its information, individually. It will be appreciated that this smaller table 1000 of FIG. 10 also will take less time to process and analyze, while still providing information comparable to much more lengthy tables, and possibly providing even more information than known logs and traces.

The benefits of the dynamic aggregation in providing compact storage of lots of data can be seen in the tables of FIGS. 8-10 which show that, although the primary IO (FIG. 8) and secondary IO (FIG. 9) go through similar services, the extra "read" service of FIG. 9 happens with certain IOs 103. The chart 1000 of FIG. 10 shows that this extra read may occur multiple times over multiple IOS. Rather than filling up and/or overflowing a conventional log or trace monitoring system, however, with the dynamic aggregation of common event 106, information, in accordance with the method 700 of FIG. 7, the data relating to this extra read is automatically and dynamically aggregated, to show, for example, that 10 out of 110 IOs followed the longer secondary IO path and 100 out of 110 IOs followed the shorter primary IO path, due to a particular service and command happening in the secondary path (i.e., the Back_end service associated with the command Read_Meta_Data). Rather than having to capture and store at least 110 separate IO events of IO information (or more) to provide this information to an entity doing analysis, the automatic, dynamic aggregation of blocks 730-765, in certain embodiments, is able to convey it in 10 lines of a table, where the table also already (effectively) has provided analysis by providing accumulated counts and accumulated and average durations, etc. This can make a significant difference in the total scope of the information collected when this is done for many hundreds or thousands of IOs 103, as will be appreciated.

Optionally, in certain embodiments, this information of FIG. 10, either by itself or upon further analysis, can be used to adjust operation of the computer system 104 and/or the host 102 and/or any code executing on such a system, as shown partially via the feedback loop 154 of FIG. 1, feeding back to a user 141 who can, based on analysis, make adjustments 153 to operation of either the computer system 154 or the host 102. Optionally in certain embodiments, based on the analysis 153, adjustments 154 to computer system 104 operation can be made. For clarity of the diagram in FIG. 1, the feedback loop from data analysis 152 to the hosts 102a, 102b, or from the user 141 directly to computer system 104 or to hosts 102 is not illustrated, but one of routine skill in the art will appreciate that a user 141 receiving the data analysis 152 also can make adjustments of host 102 and/or computer system 104 operation, as well.

In further embodiments, a user 141 could change user settings 141 to adapt the Sequential Host IO capture mode 122 (or any other mode disclosed herein) to help troubleshoot, check, or investigate particular conditions. For example, suppose it is known or discovered that a particular Host IO 103 is having issues or causing a system to "hang" in some way, such that a certain host IO 103 never gets completed. The Sequential Host IO capture mode 122 could be adapted to capture, for example, all IOs within a certain time period after the troublesome initial Host IO 103, whether or not the initial host IO 103 actually is complete, or to capture a certain number of IOs 103 after an initial Host IO 103, whether or not an initial Host IO 103 is complete. Doing this may help further analyze the issues with the original Host IO 103, while still allowing dynamic aggregation of information and also getting at least a partial analysis by having event collection end even if the original Host IO 103 is not completed.

In further embodiments, any of the disclosed modes can be modified to include various triggers that turn on the event capturing subsystem 136. In addition, other modes or settings can be configured so that, if certain conditions are met, event capturing is turned on. For instance, consider a configuration where a user wants to look at the IO performance while the computer system 104 was recovering from an error, or undergoing a software upgrade. In certain embodiments, a detection that the computer system has entered certain states, such as these states, could then turn on the event capturing system. Those of skill in the art will appreciate that there can be many conditions wherein the event collection system 116 can be configured to turn on the event capture subsystem 136 automatically.

Figure 11:
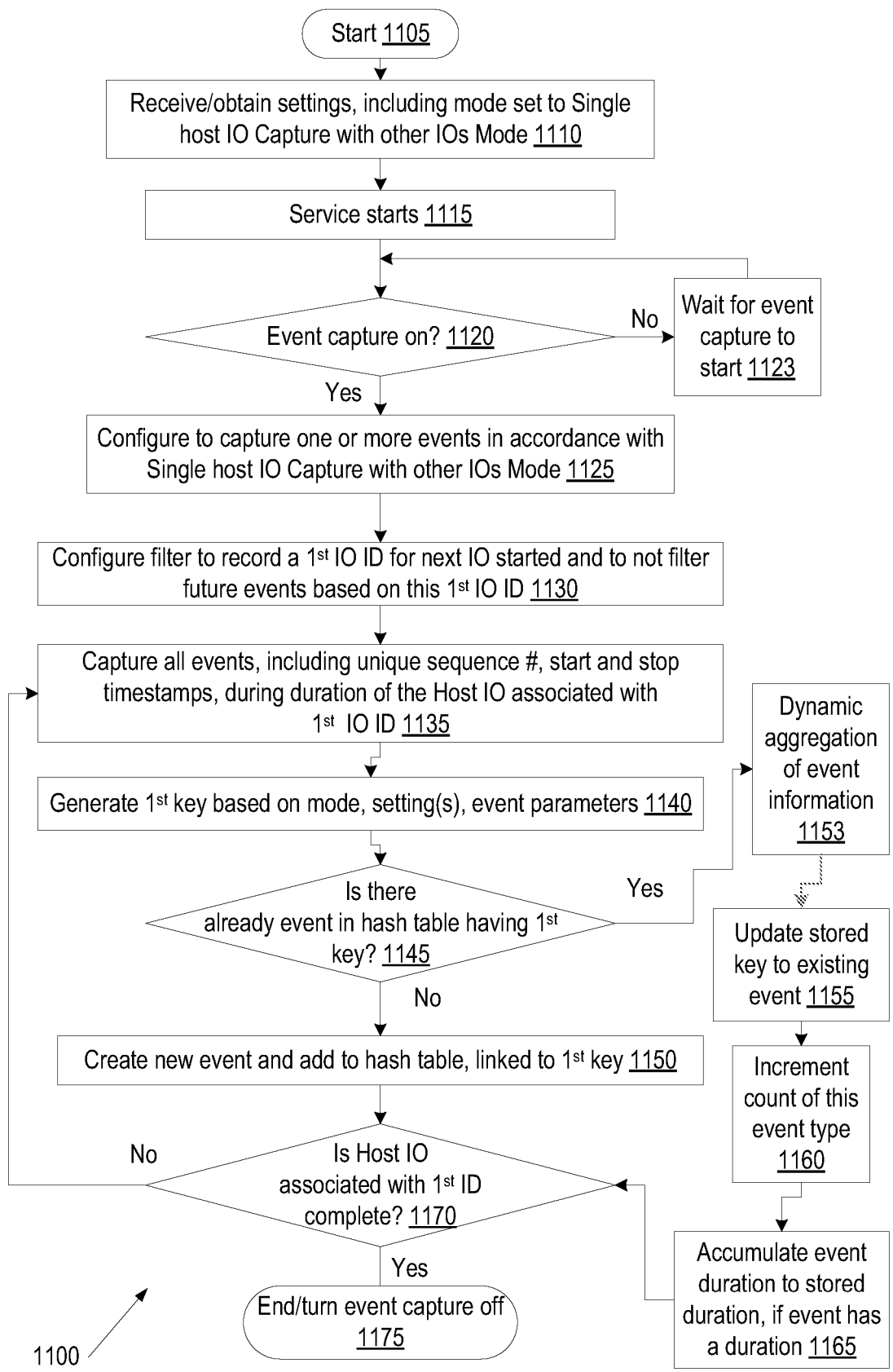
FIG. 11 is a simplified flowchart of a method for collecting information relating to event processing, for a Single Host IO Capture with other IOs Mode, in accordance with at least one disclosed embodiment.

In certain embodiments, another mode of operation is possible with the exemplary system of FIG. 1. FIG. 11 is a simplified flowchart 1100 of a method for collecting information relating to event processing, for a Single Host IO Capture with other IOs Mode 124, in accordance with at least one disclosed embodiment. In certain embodiments, Single Host IO Capture with other IOs Mode 124 enables analysis of how events 106 associated with parallel IOs 103, e.g., from different hosts 102, may impact each other, including parallel IOs 103 from more than one host, but which are happening at substantially the same or similar times, so long as these IOs 103 from the other host (and/or their associated events 106) are happening during some portion of the duration of the original IO 103 from the original host 102. In certain embodiments, the events 106 of the parallel IOs 103 from other hosts are captured up until the IO 103 from the original host 102 is completed.

A given computer system 104, such as a storage system, processes many Host IOs 103 (or other types of command/operations, as noted previously) in parallel. Therefore, when analyzing the performance of a computer system 104, it can be important to be able to see how the processing of one IO 103 may or may not affect the processing of another IO 103. Thus, in certain embodiments, Single Host IO Capture with Other IOs Mode 124 helps do that by doing a capture of a single Host IO 103, as in the Single Host IO Capture Mode 120, but this mode changes the filtering subsystem 132 parameters so that once the capture starts on a single IO 103 with a first IO identifier 108, events for Host IOs 103 with other IO identifiers 108 are also captured, if they are happening during some portion of the duration of the original IO 103 from the original host 102. In certain embodiments, this mode and its associated filtering can help to capture all IOs 3 that spent time in a given module, for example, and the event capturing also captures the total number of IOs 103 during time of the original single IO 103 with the first IO identifier 108. This enables, during analysis 152 of the captured and recorded information, analysis of the average amount of time that any IO 103 spends in a given module of program, process, etc.

Referring to FIGS. 1 and 11, blocks 1105-1125 are substantially similar to the functions of corresponding blocks 305-325 in FIG. 3, other than the fact that the settings are setting the mode specifically to Single Host IO Capture with Other IOs mode 124, and the descriptions of these blocks are not repeated here. In block 1120, if the answer is "Yes" (i.e., the event capture subsystem 136 is turned on by the user), the filtering subsystem 132 records the IO identifier 108 for the next Host IO 103 that is started, however it does not filter any future events based on this IO identifier 108 (block 1130).

Then events 106 start to be captured (block 1124), where each event 106 includes a unique sequence number 112. The sequence number 112 records the order in which the events 106 were generated. In certain embodiments, the order in which the events 106 were generated also is the order of the steps that the storage array took when it processed the primary IO 103 and all the IOs 103 that were being processed at the same time as the primary. Each event 106 also includes start and stop timestamps 115 that together indicate how long the processing took for a given event 106 (block 1135).

In block 1140, the key 135 is generated, based at least in part on the mode (i.e., Single Host IO Capture with other IOs 124), on the user settings 144, and event parameters. In certain embodiments, in Single Host IO Capture with other IOs mode 124, the event capture starts and ends based on the start and end of a random IO 103 (the first one after the event capture subsystem 136 is enabled (answer at block 1120 is "Yes")). In certain embodiments, to generate the key 125 the key generator 134 does not ignore any parameters of the event 106. In certain embodiments, in particular, the sequence number 112 is always unique for each event 106. This means that an entry is created in the hash table 140 for every event 106 between start and end of the first IO 103. Thus, the Single Host IO Capture with other IOs mode 124 captures what other IOs are doing while a first IO 103 running. Thus, this mode 124 can show the interaction between IOs 103, which can be very advantageous in helping to analyze and improve performance of the computer system 104 and/or code/processes that are executing on the computer system 104.

Blocks 1145 through 1165 of FIG. 11 are substantially similar to corresponding blocks 345 through 365 of FIG. 3, and corresponding blocks 445 through 465 of FIG. 4, discussed previously above, and the descriptions of these blocks' functions are not repeated in the same level of detail. Again, note that block 1153 recites that dynamic aggregation of the collected, filtered event 106 information, happens, including in blocks 1155-1165. At block 1170, if the Host IO 102 associated with the first IO identifier 108, is not complete (answer at block 1170 is "No"), then processing returns to block 1125 to continue capturing events 106.

Referring again to FIGS. 1 and 11, when the Host IO 103 having the original IO identifier 108 is completed, (answer at block 1170 is "Yes") the event capture subsystem 136 is turned off (block 1175), so capture of the IOs 103 in parallel also stops.

Figures 12, 13:
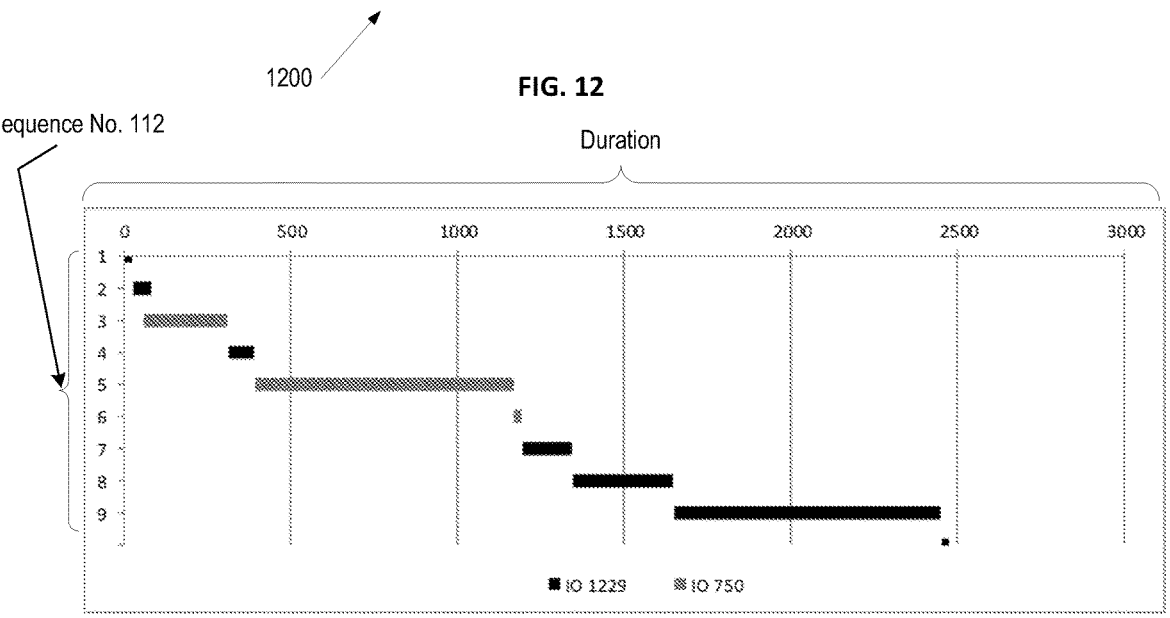
FIG. 12 is a chart showing, in tabular form, an illustrative example of Single Host IO Capture with other IOs Mode information collected in accordance with the method of FIG. 11, in accordance with at least one disclosed embodiment.
FIG. 13 is an illustrative graph showing the Single Host IO Capture with other IOs Data information of the chart of FIG. 12, in graphical timeline form, in accordance with at least one disclosed embodiment.

FIG. 12 is a chart 1200 showing, in tabular form, an illustrative example of Single Host IO Capture with other IOs Mode information collected in accordance with the method of FIG. 11, in accordance with at least one disclosed embodiment. FIG. 13 is an illustrative graph 1300 showing the Single Host IO Capture with other IOs Data information of the chart of FIG. 12, in graphical timeline form, in accordance with at least one disclosed embodiment. FIGS. 12 and 13 are illustrative examples of what the capture data might look like in Single Host IO Capture with Other IOs mode 124, using the method of FIG. 11. As the examples of FIGS. 12 and 13 show, the Host IO 103 having the IO identifier 108 of "1229" was the primary IO, but the Host IO 103 having the IO identifier 108 of "750" was also being processed during substantially the same time as the host IO 103 having the IO identifier 108 of "1229" (as shown via the partial overlaps in FIG. 13). The data of FIGS. 12 and 13 also shows how the processing of one IO 103, the IO 103 with IO identifier 108 of "750", affects the time it takes to process the other IO, 103 with IO identifier 108 of "1229". The timeline graph 1300 of FIG. 13 is particularly good at showing the interactions between these two IOs 103. The graphs of FIGS. 12 and 13 also how the dynamic aggregation, e.g., the event counts, durations, etc., can greatly reduce and simplify the amount of data to be analyzed, while still showing enough information and relationships between data to help determine actions needed to improve performance.

In addition, by showing the single IO host capture of two different IOs, in FIG. 13, analysis 152 can be performed on the captured data to understand the IOs 103 that are happening at substantially the same time as a given IO 103. FIGS. 12 and 13, when analyzed, also can reveal issues such as different entities contending for the same resource, or that one IO 103 (e.g., the IO 103 associated with the IO identifier 108 having the value of "750") might be holding a lock on a resource that an IO 103 associated with the IO identifier 108 having the value of "1229," may need. So, based on the analysis 152, checks can be made regarding IO 103 dependencies, timing, etc., to see if anything can be changed in the execution paths, or the sharing of resources, etc., to help reduce, at least partially, the likelihood of locks, latency, contentions, delays, IO 103 spending too long at certain execution points, etc., and other problems.

In certain embodiments, another operational mode is usable with the exemplary embodiment of FIG. 1. FIG. 14 is a simplified flowchart 1400 of a method for collecting information relating to event processing, for a Capture All IOs Mode 126, in accordance with at least one disclosed embodiment. In the Capture all IOs Mode 126, all IOs 103 are captured. Referring to FIGS. 1 and 14, blocks 1405-1425 are substantially similar to the functions of corresponding blocks 305-325 in FIG. 3, other than the fact that the settings are setting the mode specifically to Capture all IOs mode 126, and the descriptions of these blocks are not repeated here.

In block 1420, when the user turns on the event capture subsystem 136 (answer at block 1420 is "Yes"), the event collection system 116 will be configured to capture all the events for all the Host IOs 103 from a given Host 102, when event capture starts (block 1435). As noted previously herein, it is not important, in certain embodiments, which host 102 the IO 103 to be captured comes from, because the interest is in seeing how long on a computer system 104 (or a code/process executing thereon) spends in the various code paths. For example, it may be of interest to determine how long processes spends in a service, such as the cache service. In certain embodiments, to do this, events 106 for all IOs 103 are captured. Thus, in this mode, the IO ID 108 can be ignored. In addition, in certain embodiments, because the method is accumulating the times for each type of event 106, the sequence ID 112 also can be ignored.

In Capture All IOs mode 126, when the key 135 is generated for each event 106 based on the mode (block 1440), the key generator subsystem 134 is configured to ignore the IO identifier 108 and the sequence number 112. This means, in certain embodiments, that events from different IOs 103 will map to the same persisted event 106, resulting in the persisted event 106 having its count incremented and the duration time accumulated. This is another way of getting an average time for the duration of a particular event across many IOs 103, while still capturing event information in an efficient manner as compared to conventional log and trace operations.

Referring again to FIGS. 1 and 14, blocks 1445 through 1465 of FIG. 14 are substantially similar to corresponding blocks 345 through 365 of FIG. 3, and corresponding blocks 445 through 465 of FIG. 4, discussed previously above, and the descriptions of these blocks' functions are not repeated in the same level of detail. Again, note the dynamic aggregation of blocks 1453-1465, which helps to produce the example information in the chart 1500 of FIG. 15. At block 1470, event capture continues (answer at block 1470 is "No") until all desired host IOs 103 associated with an event have been captured, then a user 141 turns off event capture (block 1475).

FIG. 15 is a chart 1500 showing, in tabular form, an illustrative example of Capture all IOs Mode 126 information collected in accordance with the method of FIG. 14, in accordance with at least one disclosed embodiment. As the chart 1500 shows, sequence number 112 and IO identifier 108 are not part of the collected information, but it can still be seen which services and commands have the longest average duration. The count of 128 shows that 128 IOs were captured and that they all passed through the same set of capture events in the code. If, for example, only a single IO 103 was sent to the computer system 104, then the count in FIG. 15 would be 1.

The above described modes of collecting performance data in a computer system can provide, in certain embodiments, at least some advantages over other approaches. For example, at least some of the above-described modes have less of a performance impact. The event capture subsystem 126 can be turned on/off, and the filtering subsystem 132 can be very quick. Thus, in certain embodiments, this means there is very little impact to the system performance of either the host 102 or the computer system 104 when events 106 are not being captured. In contrast, in at least some logging or tracing systems, there is no way to turn event collection on or off. This can mean that the logging or tracing is always impacting the system performance.

In addition, at least some of the described embodiments and modes of operation require less storage than at least some known approaches. For example, in the four described modes 120-126, event capturing is either done for the period of a single IO 103, or if many IOs 102 are captured, their corresponding events 106 are aggregated. The storage requirements for this aggregation are relatively small. In contrast, at least some logging or tracing systems retain each log or trace event. This requires a large amount of storage.

Another advantage of certain embodiments is that, when event capturing is done over long periods of time, it is often aggregating events 106 of the same type. This means that the storage requirements for capture and/or aggregation do not grow with the length of the capture period. In contrast, with logging or tracing, the storage requirements are always increasing as each new event must be kept individually. This means that eventually older logging/tracing data must be purged, limiting the period over which data can be gathered.

A further advantage of at least some embodiments, is that analysis can be easier. Because certain embodiments generate much less data, such data is easier to look at and analyze. In contrast, searching through a log file for all the relevant log messages, analyzing them and then creating a timeline graph, like the timeline graphs in the Figures such as seen in FIG. 8, would be extremely difficult and time consuming.

It is envisioned that some or all of the disclosures herein could be combined with or adapted to work with, partially replace, supplement, and/or improve existing implementations of systems that may use logs, traces, and other monitoring, as well as any other system that collects or processes performance statistics.

In addition, at least some of the described embodiments provide a general infrastructure and set of operating modes that are adaptable and modifiable, as will be appreciated by those of routine skill in the art. For example, users can dynamically alter the user settings 144 to change what is being tracked, turn event capture on and off, modify the filtering settings 146, to obtain information about different types of performance at different times, and this can be done for any reason, including but not limited to because the results of the analysis of previously collected information. Modifying the filtering settings 146 in one embodiment, can, for example, include deciding what host IOs 103 to filter by setting the filter to filter based on IO identifier 108. Similarly, event parameters can be configured so that one parameter is not part of filtering, which can help to capture more events, or can be configured so that certain parameters are focused on to help aggregate together events with one or more common features.

In other embodiments, it may be of interest to configure the user settings 142 to capture only certain "critical" events, so the time period during which events are captured might be longer, because fewer IOs 103 will need to be captured and recorded. In further embodiments, as discussed previously, event capture can be configured to happen with different levels of granularity, so as to capture events 106 more or less frequently, as needed.

In still further embodiments, it may be of interest to configure the user settings 142 to capture events 106 that happen with great frequency, so the event capture subsystem 136 may be configured to capture only a short time frame's worth of data (e.g., in some examples, only a few seconds of data). Further, although FIG. 1 depicted just two hosts 102*a*, 102*b* and a single computer system 104, the event collection system 116 can be adapted to work with a plurality of hosts 102 and/or a plurality of computer systems 104. In addition, as noted previously, although the examples and figures were discussed in connection with capture of IOs, the disclosed embodiments are not limited, and other types of communications could be captured, recorded, and analyzed, as well. There are many different ways to adapt and use the disclosures made herein, depending on whether there is an interest in looking at a specific IO 103 and how it is impacted by other actions (and how it impacts other action), whether there is interest in trying to aggregate across many IOs 103, whether there is interest in analyzing a set of IOs 103, and/or whether there is interest in considering all IOs 103.

The infrastructure 100 for capturing and recording of the IOs 103 associated with events, can be implemented in many different ways, as one of routine skill in the art will appreciate, and is not limited to hardware or software structures. Further, in certain embodiments, the infrastructure 100 could be a separate entity or could itself be built into either or both of the host 102 and the computer system 104, or other client or entity in operable communication with the system whose performance data is being collected, or could be provided as software as a service (SaaS) or as a software "add-on" or extension configured to add this capability to existing software and/or hardware. As noted previously, it can be especially useful if the infrastructure 100 for capturing events is actually part of the code being analyzed. Advantageously, in certain embodiments, use of the infrastructure 100 of FIG. 1, in combination with operating in accordance with any one or more of the modes described herein, can provide performance data without causing burdens on the system being checked. with which it communicates. The infrastructure 100 and methods and data collection (e.g., FIGS. 2-15) described herein, in certain embodiments, can be implemented and adapted to work in many types of systems, including storage systems, database systems, etc., operating in many different types of environments, including cloud computing environments.

In the above-described flow charts and sequence diagrams, certain elements (e.g., rectangular elements, diamond shaped elements, and statements preceded by a number in a circle), herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow charts and sequence diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Further, the processes and operations described herein can be performed by a computer especially configured for the desired purpose or by a general-purpose computer especially configured for the desired purpose by another computer program stored in a computer readable storage medium or in memory.

FIG. 16 is a simplified block diagram of an apparatus that may be used to implement at least a portion of the systems, architectures, sequence diagrams, and method of FIGS. 1-15, in accordance with at least some embodiments.

As shown in FIG. 16, computer 1600 may include processor 1602, volatile memory 1604 (e.g., RAM), non-volatile memory 1606 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1610 (e.g., a touchscreen, a display, and so forth) and input and/or output (I/O) device 1608 (e.g., a mouse, a keyboard, etc.). Non-volatile memory 1604 stores, e.g., journal data 1604*a*, metadata 1604*b*, and pre-allocated memory regions 1604*c*. The non-volatile memory, 1606 can include, in some embodiments, an operating system 1614, and computer instructions 1612, and data 1616. In certain embodiments, the computer instructions 1612 are configured to provide several subsystems, including a routing subsystem 1612A, a control subsystem 1612b, a data subsystem 1612c, and a write cache 1612d. In certain embodiments, the computer instructions 1612 are executed by the processor/CPU 1602 out of volatile memory 1604 to implement and/or perform at least a portion of the systems and processes shown in FIGS. 1-15. Program code also may be applied to data entered using an input device or GUI 1610 or received from I/O device 1608.

The systems, architectures, sequences, flowcharts, and processes of FIGS. 1-16 are not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 16, which is useful for carrying out a method described with reference to embodiments shown in, for example, FIGS. 1-16. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor 1602 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 16, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 16 shows Program Logic 1624 embodied on a computer-readable medium 1620 as shown, and wherein the Logic is encoded in computer-executable code configured for carrying out the reservation service process of this invention and thereby forming a Computer Program Product 1622. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

The invention claimed is:

1. A computer-implemented method, comprising:
    configuring an event collection system to capture event data for a plurality of events of a computer system, wherein the event collection system is configured to run an event collection process configured to filter event data as it is collected, in accordance with a predetermined setting, wherein the predetermined setting is configured to determine the event data that is captured by the event collection process, a duration of the event collection process, and to determine how captured event data is stored in an event storage structure of the event collection system; and
    configuring the event collection process to run in cooperation with the event collection system, the event collection process comprising:
        capturing first information relating to a first event of the computer system, the first information comprising information relating to a first respective plurality of event parameters;
        generating a first event key during the event collection process, wherein the first event key is generated based on at least some of the first plurality of event parameters;
        storing the first event key and the captured first information, as part of a first event storage in the event storage structure, wherein the first event key is configured to index the first event and the captured first information in the event storage structure;
        capturing second information relating to a second event of the computer system, the second information comprising information relating a second respective plurality of event parameters;
        generating a second event key during the event collection process, wherein the second event key is generated based on the second plurality of event parameters;
        analyzing the first event key and the second event key, during the event collection process, to determine whether the first event key matches the second event key;
        if the second event key does not match the first event key, then storing the second event key and the captured second information as a second event in the event storage structure, wherein the second event key is configured to index the second event and the captured second information in the event storage structure, and wherein the second event is distinct from the first event, in the event storage structure; and
        if the second event key matches the first event key, then dynamically updating the first event stored in the event collection system, to store the second event information as part of the first stored event, wherein storing the second event information as part of the first stored event is configured to minimize any additional storage space needed, in the event collection structure, for second event storage and wherein dynamically updating the first event takes place during the event collection process.

2. The computer-implemented method of claim 1, wherein dynamically updating the first event further comprises:
    configuring an event counter in the event storage structure to track how many events that are stored in the event storage structure, share the same event key; and
    incrementing the event counter to add the second event to a respective first event count it maintains for the first event.

3. The computer-implemented method of claim 1, wherein dynamically updating the first event further comprises aggregating the second information with the first information.

4. The computer-implemented method of claim 1, wherein dynamically updating the first event further comprises configuring the first event key to also index the second event and the captured second information in the event storage structure.

5. The computer-implemented method of claim 1, wherein the first plurality of event parameters comprises at least a portion of parameters that are unique to the first event, and wherein the first event key is generated by combining the portion of parameters that are unique to the first event, into the first key.

6. The method of claim 1, wherein the predetermined setting comprises an operational mode selected from the group consisting of:
    single host input/output (IO) capture;
    sequential host IO capture;
    single host IO capture with other IO's; and
    capture all IOs.

7. The computer-implemented method of claim 1, further comprising:
    analyzing at least a portion of the events stored in the event storage structure, to detect at least one problem resulting in at least one performance issue in the computer system; and
    based on the analysis, changing the operation of the computer system to fix the at least one problem.

8. A system, comprising:
    a processor; and
    a non-volatile memory in operable communication with the processor and storing computer program code that when executed on the processor causes the processor to execute a process operable to perform the operations of:
        configuring an event collection system to capture event data for a plurality of events of a computer system, wherein the event collection system is configured to run an event collection process configured to filter event data as it is collected, in accordance with a predetermined setting, wherein the predetermined setting is configured to determine the event data that is captured by the event collection process, a duration of the event collection process, and to determine how captured event data is stored in an event storage structure of the event collection system; and
        configuring the event collection process to run in cooperation with the event collection system, the event collection process comprising:
            capturing first information relating to a first event of the computer system, the first information comprising information relating to a first respective plurality of event parameters;

generating a first event key during the event collection process, wherein the first event key is generated based on at least some of the first plurality of event parameters;

storing the first event key and the captured first information, as part of a first event storage in the event storage structure, wherein the first event key is configured to index the first event and the captured first information in the event storage structure;

capturing second information relating to a second event of the computer system, the second information comprising information relating a second respective plurality of event parameters;

generating a second event key during the event collection process, wherein the second event key is generated based on the second plurality of event parameters;

analyzing the first event key and the second event key, during the event collection process, to determine whether the first event key matches the second event key;

if the second event key does not match the first event key, then storing the second event key and the captured second information as a second event in the event storage structure, wherein the second event key is configured to index the second event and the captured second information in the event storage structure, and wherein the second event is distinct from the first event, in the event storage structure; and if the second event key matches the first event key, then dynamically updating the first event stored in the event collection system, to store the second event information as part of the first stored event, wherein storing the second event information as part of the first stored event is configured to minimize any additional storage space needed, in the event collection structure, for second event storage and wherein dynamically updating the first event takes place during the event collection process.

9. The system of claim 8 wherein dynamically updating the first event further comprises providing computer program code that when executed on the processor causes the processor to perform the operations of:

configuring an event counter in the event storage structure to track how many events that are stored in the event storage structure, share the same event key; and incrementing the event counter to add the second event to a respective first event count it maintains for the first event.

10. The system of claim 8 wherein dynamically updating the first event further comprises providing computer program code that when executed on the processor causes the processor to perform the operation of aggregating the second information with the first information.

11. The system of claim 8 wherein dynamically updating the first event further comprises providing computer program code that when executed on the processor causes the processor to perform the operation of configuring the first event key to also index the second event and the captured second information in the event storage structure.

12. The system of claim 8, wherein the first plurality of event parameters comprises at least a portion of parameters that are unique to the first event, and the system further comprises providing computer program code that when executed on the processor causes the processor to perform the operation of generating the first key by combining the portion of parameters that are unique to the first event, into the first key.

13. The system of claim 8, wherein the predetermined setting comprises an operational mode selected from the group consisting of:

single host input/output (IO) capture;
sequential host IO capture;
single host IO capture with other IO's; and
capture all IOs.

14. The system of claim 8, further comprising providing computer program code that when executed on the processor causes the processor to perform the operations of:

analyzing at least a portion of the events stored in the event storage structure, to detect at least one problem resulting in at least one performance issue in the computer system; and based on the analysis, changing the operation of the computer system to fix the at least one problem.

15. A computer program product including a non-transitory computer readable storage medium having computer program code encoded thereon that when executed on a processor of a computer causes the computer to operate a storage system, the computer program product comprising:

computer program code for configuring an event collection system to capture event data for a plurality of events of a computer system, wherein the event collection system is configured to run an event collection process configured to filter event data as it is collected, in accordance with a predetermined setting, wherein the predetermined setting is configured to determine the event data that is captured by the event collection process, a duration of the event collection process, and to determine how captured event data is stored in an event storage structure of the event collection system; and computer program code for configuring the event collection process to run in cooperation with the event collection system, the event collection process comprising:

computer program code for capturing first information relating to a first event of the computer system, the first information comprising information relating to a first respective plurality of event parameters;

computer program code for generating a first event key during the event collection process, wherein the first event key is generated based on at least some of the first plurality of event parameters;

computer program code for storing the first event key and the captured first information, as part of a first event storage in the event storage structure, wherein the first event key is configured to index the first event and the captured first information in the event storage structure;

computer program code for capturing second information relating to a second event of the computer system, the second information comprising information relating a second respective plurality of event parameters;

computer program code for generating a second event key during the event collection process, wherein the second event key is generated based on the second plurality of event parameters;

computer program code for analyzing the first event key and the second event key, during the event collection process, to determine whether the first event key matches the second event key;

computer program code for providing, if the second event key does not match the first event key, then storing the second event key and the captured second information as a second event in the event storage structure, wherein the second event key is configured to index the second event and the captured second information in the event storage structure, and wherein the second event is distinct from the first event, in the event storage structure; and computer code for providing, if the second event key matches the first event key, then dynamically updating the first event stored in the event collection system, to store the second event information as part of the first stored event, wherein storing the second event information as part of the first stored event is configured to minimize any additional storage space needed, in the event collection structure, for second event storage and wherein dynamically updating the first event takes place during the event collection process.

16. The computer program product of claim 15, wherein the computer program code for dynamically updating the first event further comprises:

computer program code for configuring an event counter in the event storage structure to track how many events that are stored in the event storage structure, share the same event key; and computer program code for incrementing the event counter to add the second event to a respective first event count it maintains for the first event.

17. The computer program product of claim 15, wherein the computer program code for dynamically updating the first event further comprises computer program code for aggregating the second information with the first information.

18. The computer program product of claim 15, wherein the computer program code for dynamically updating the first event further comprises computer program code for configuring the first event key to also index the second event and the captured second information in the event storage structure.

19. The computer program product of claim 15, wherein the first plurality of event parameters comprises at least a portion of parameters that are unique to the first event, and further comprising computer program code for generating the first key by combining the portion of parameters that are unique to the first event, into the first key.

20. The computer program product of claim 15, further comprising:

computer program code for analyzing at least a portion of the events stored in the event storage structure, to detect at least one problem resulting in at least one performance issue in the computer system; and computer program code for, based on the analysis, changing the operation of operation of the computer system to fix the at least one problem.

* * * * *